US006723444B2

(12) United States Patent
Kobayashi et al.

(10) Patent No.: US 6,723,444 B2
(45) Date of Patent: Apr. 20, 2004

(54) IMAGE RECORDING MATERIAL AND IMAGE DISPLAY MATERIAL USING THE SAME

(75) Inventors: Tomoo Kobayashi, Minamiashigara (JP); Kunio Sakurai, Ashigarakami-gun (JP); Kaoru Torikoshi, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/347,289

(22) Filed: Jan. 21, 2003

(65) Prior Publication Data

US 2003/0232275 A1 Dec. 18, 2003

(30) Foreign Application Priority Data

Jun. 17, 2002 (JP) ....................................... 2002-176005

(51) Int. Cl.[7] ......................... B32B 27/08; B32B 27/18; B32B 27/20; B32B 27/36

(52) U.S. Cl. ......................... 428/480; 428/195; 430/18; 528/302; 528/305; 528/308; 528/308.6; 528/308.7

(58) Field of Search ................................. 428/195, 480; 430/18; 528/302, 305, 308, 308.6, 308.7

(56) References Cited

U.S. PATENT DOCUMENTS 4,990,486 A * 2/1991 Kamosaki et al. .......... 503/227
5,342,819 A * 8/1994 Takiguchi et al. .......... 503/227
5,484,759 A * 1/1996 Suto et al. .................. 503/227
6,074,788 A * 6/2000 Bourdelais et al. ........... 430/18

FOREIGN PATENT DOCUMENTS

EP 0 557 989 A1 * 9/1993

* cited by examiner

*Primary Examiner*—Vivian Chen
(74) *Attorney, Agent, or Firm*—Oliff & Berridge, PLC

(57) ABSTRACT

The present invention provides an image recording material as well as a protective film and an image display material using the same, the image recording material comprising at least: a transparent substrate; an image-receiving layer for forming an image by an electrophotographic system and disposed on one side of the substrate; and a function controlling means disposed on the other side of the substrate; wherein the image-receiving layer include a polyester resin which comprises a structural unit represented by the structural formula (I) and which has a number average molecular weight of 12,000 to 45,000:

Structural formula (I)

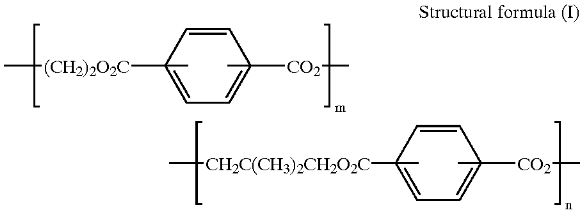

wherein n and m represent integers such that a molar ratio n/m is from 1 to 9.

17 Claims, 1 Drawing Sheet

IMAGE RECORDING MATERIAL AND IMAGE DISPLAY MATERIAL USING THE SAME

BACKGROUND OF THE INVENTION

1. Field of the Invention

The present invention relates to an image recording material having an image formed (recorded) by an image-forming device in an electrophotographic system and an image display material using said image recording material.

2. Description of the Related Art

As image-forming techniques have been developed in recent years, methods of forming images of similar qualitiy inexpensively in large amounts by various printing methods such as intaglio printing, letterpress printing, planographic printing, gravure printing and screen printing are known. In particular, screen-printing can highly accurately produce printed materials (commodities) of highly sophisticated design, such as displays or membrane switches for household appliances, various labels, the clock faces, outdoor signboards, posters and scarves. It is assumed that these printed materials are used not only in ordinary indoor environments (office environments) but also outdoors, and thus there is demand for high heat resistance at a temperature of about 100° C. and high light resistance to sunlight (mainly UV rays). Accordingly, when printed materials to be used outdoors are formed by screen printing, a pigment-based ink excellent in heat resistance and light resistance so as not to deteriorate the qualities of images at a temperature of about 100° C. for several hundreds hours or in a light resistance testing machine such as a sunshine meter or a fade meter for several hundreds hours is selected and used, in consideration of the fact that the printed materials are to be used under UV rays or sunrays.

Screen printing requires many printing plates in accordance with the number of images to be printed, and color printing requires additional printing plates in accordance with the number of colors. In particular, printed materials of highly sophisticated design are required often in a small number of different forms (production of a small number of different kinds of printed materials) so that the printing plates must be remade every time shapes of the pointed materials change, or the printing plates are changed to cope with a different number of printed materials, thus requiring a large number of different kinds of printing plates. Accordingly, the production of printed materials of highly sophisticated design by screen printing has a problem, in that storage and handling of a large number of printing plates require a lot of trouble and time.

In the screen printing process, organic solvents and the like are contained in the ink, so that not only the influence of the organic soluvents on the human body but also environmental pollution should be taken into consideration. Further, drying of these organic solvents requires enormous energy and time for drying, and causes a reduction in productivity. In order to utilize the printing plate repeatedly, the printing plate must be washed, thus requiring a large amount of organic solvents for the washing. When the printing plate is replaced, a screen printing head stained with previously-used ink should also be replaced, and cleaning the head requires time, leading to a further reduction in productivity.

On the other hand, formation (printing) of an image in the electrophotographic system is conducted by charging an image carrier uniformly and exposing it to light in accordance with an image signal, to form an electrostatic latent image by a potential difference between an exposed portion and a non-exposed portion, followed by electrostatic development of a color powder (image forming material) called a toner having polarity opposite to the charge thereby forming a visuable image (toner image). In the case of a color image, this process is repeatedly carried out to form visual color images which are then transferred and fixed (mainly by cooling the previously thermally melted color powder), to obtain a color image.

As described above, the electrostatic latent image on the image carrier is electrically formed using an image signal in the electrophotographic system, thus permitting not only the same image to be repeatedly formed but also different image to be easily formed. Further, the toner image on the image carrier can be transferred almost completely to the image recording material, and the slight amount of toner image remaining on the image carrier can be easily removed by a resin blade or a brush, and thus printed materials can be produced easily in a small number of different forms.

The toner is formed typically by mixing additives such as hot-melt resin, a pigment, and, if necessary, a charge controlling agent, and pulverizing the mixture through milling. As compared with the pulverized toner, the electrostatic latent image in the electrophotographic system has sufficiently high resolution, and can be expected to have sufficiently high resolution, even compared to screen printing.

Further, the color toner has four primary colors of cyan, magenta, yellow and black, and by mixing these colors, any color identical to those in printing can be theoretically obtained. Further, the color toner can be arbitrarily blended with a toner resin and a pigment, and thus the shielding of an image by the toner can be easily increased. Further, when a small number of required colors are required, single-color toners can be layered for further increasing the shielding of the image.

It is assumed that the image-recording material (printing paper) of the electrophotographic system will be used in the general office environment, that is, at a temperature of 10° C. to 30° C. under about 15% to 85% humidity, and therefore, there has been almost no examination of heat resistance and light, which resistance assumes that the image-recording material will be used outdoors. In the formation of a color image in the electrophotographic system, however, pigments of cyan, magenta, yellow and black, which have excellent light resistance are being used, so the image recording material in the electrophotographic system can be expected to be highly light resistant. When a heat-resistant toner is selected, it is thought that the image recording material can also be endowed with heat resistance to such an extent as to be usable outdoors.

As compared with silk screening, the formation of an image with the electrophotographic system requires no planographic plate as described above, and different, vivid images can be easily produced. Therefore, the image recording material in the electrophotographic system is used under various situations. recent topics in the medical field are a name card (with a photograph of a face), which is used for confirmation of a medical worker, and a display material, which has a photograph of a face and is recently being attached to a bed of a hospitalized patient in order to identify the patient, thus preventing mistakes in treatment. The displaying material using a printing paper can be easily forged, easily damaged and easily combusted, and therefore, printing of the display material on a film or plate is desired. Moreover, in consideration of pathogenic microorganisms in the hospital, such as MRSA, there is also a demand for imparting the display material with functions such as microbial resistance and flame retardancy. Further, when the surface of the indicating material is glossy like a photographic paper, the surface thereof may be poor in visibility because of light reflection depending on the viewing angle. Accordingly, it is also desired that the gloss of the surface be suppressed to improve visibility.

In the electrophotographic system, however, when an image-forming substrate is made of a thin film, an image cannot follow flexing of the film when a sufficient amount of a toner is fixed as the image. This causes a problem such as cracking on the surface of the image. In the electrophotographic system, fixing temperature and fixing pressure are sufficiently applied by a fixing roller at the time of fixation process, and thus the toner is sufficiently melted to obtain a high-gloss (color) image having a flat surface. The high-gloss color image gives excellent image qualities in the case of a photographic image of relatively high density, while a considerable difference in gloss between the high-gloss color image and the surface of the printing paper causes problems such as remarkable "glittering" and a deterioration in visibility attributable to a change in gloss depending on the viewing angle as described above.

To prevent a reduction in the visibility of an image depending on the viewing direction, a method has been proposed, in which a toner having a high melting temperature is used in the electromagnetic system, and the toner is fixed under such conditions as not to be sufficiently melted, thus reducing the surface gloss of the image. However, when the toner is not sufficiently melted, a part of the toner is often melted unevenly, resulting not only in uneven gloss (phenomenon of partially varying gloss) but also in a deterioration in fixation of the toner to the image recording material, so controlling surface gloss by the fixing conditions is difficult.

Further, Japanese Patent Application Laid-Open (JP-A) No. 9-171266 proposes an image recording material and a method of controlling the surface gloss of an image wherein a porous coating solution consisting of a porous resin is applied onto an image-receiving layer, to form a porous film on the surface of the image-receiving layer thereby increasing surface scattering and reducing the surface gloss, and simultaneously a toner is embedded in this porous coating thereby reducing the surface gloss of the image. However, it is difficult to reduce the surface gloss sufficiently with this method, and a sufficient amount of a toner is necessary for raising the shielding power of the image, and thus an excess of the toner which cannot be adsorbed onto the porous coating may increase the surface gloss of the image.

Further, a method of reducing surface gloss by making a surface uneven by techniques such as sand blasting to reduce surface gloss by light scattering on the surface has also been proposed. However, sand blasting should be conducted vigorously in order to increase uniformity of the surface, resulting in problems such as the surface gloss being overly reduced and a reduction in image qualities due to the uneven surface of the image.

A phenomenon of fusion of a color toner with a fixing roller (hot offset) is known to occur when a color image is formed by the electrophotographic system. To prevent this phenomenon, the fixing roller is dipped in, coated with, or provided with, a release agent such as silicone oil, but a great problem arises in the fixing device; that is, the writing ability of an image is deteriorated due to adhesion of the silicone oil to the image recording material, the adhesion of an adhesive tape to the image recording material is made insufficient, the texture of the recording material is deteriorated due to stickiness, qualities of the image such as transmittance are deteriorated, and the abrasion resistance of the roll is lowered due to dipping in the oil.

As a counter measure to these related problems, a method of fixing without using an oil (oil-less fixing) and a method of using a toner (oil-less toner) comprising a toner resin blended with various release agents such as an organic polymer wax such as polyethylene wax and polypropylene wax or natural wax such as carnauba wax, have been proposed in order to prevent offset.

Under the presence circumstances, however, there is a problem, in that, for the purpose of forming an excellent image and improving the ability of the image to be stored, a color coating paper or a color-image OHP film provided on the surface of a substrate with an image-receiving layer having high affinity for a toner cannot be subjected to fixation without using a fixing oil because the whole surface of the image recording material is contacted with the fixing roll, resulting in the offset of the image recording material on the fixing roll.

As described above, when the image-forming surface is to be endowed with gloss or other functions required for use in severe environments, regulation of the functions is difficult for the reason unique to the image in the electrophotographic system. This is also a problem when other various functions are given to the image-forming surface.

SUMMARY OF THE INVENTION

The present invention is made to solve the problem described above, and an object of the invention is to provide an image recording material and an image display material using the same, which-are capable of easily forming a high-quality image with good visibility and have sufficient heat resistance, light resistance and flame retardancy even in outdoor use. Another object of the invention is to provide an image-recording material and an image display material using the same, which have functions capable of coping with various environments. Still another object of the invention is to provide an image-recording material and an image display material using the same, which do not generate the phenomenon of offset even if an oil-less toner is used.

To achieve these objects, as a result of extensive studies, the inventors discovered an image recording material having a structure wherein an image-receiving layer is disposed on one side of a transparent substrate, and a reverse image (mirror image) is formed such that when the image is viewed through the substrate, the image is seen as a normal rotation image (normal image) on the surface of the image-receiving layer, while the other side of the substrate is provided with a regulation-controlling means having various functions such as regulation of gloss.

That is, a first aspect of the present invention is an image recording material comprising: a transparent substrate; an image-receiving layer for forming an image by an electrophotographic system and disposed on one side of the substrate; and a function-controlling means disposed on the other side of the substrate;

wherein the image-receiving layer include a polyester resin which comprises a structural unit represented by the structural formula (I) and which has a number average molecular weight of 12,000 to 45,000:

Structural formula (I)

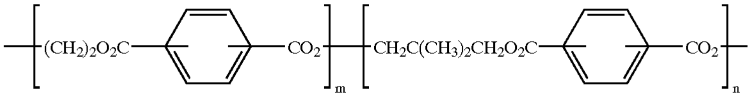

wherein n and m represent integers such that a molar ratio n/m is from 1 to 9.

A second aspect of the present invention provides the image recording material, wherein the image-receiving layer further comprises a charge controlling agent.

A third aspect of the present invention provides the image recording material, wherein the charge controlling agent is a surfactant.

A fourth aspect of the present invention provides the image recording material, wherein the function controlling means comprises a function-controlling layer for controlling at least one function selected from gloss, microbial resistance, flame retardancy, light resistance and chargeability.

A fifth aspect of the present invention provides the image recording material, wherein the function-controlling layer has a function of controlling gloss, and the function-controlling layer comprises a resin and a filler.

A sixth aspect of the present invention provides the image recording material, wherein the function-controlling layer has a function of controlling microbial resistance, and the function-controlling layer comprises an inorganic antimicrobial agent.

A seventh aspect of the present invention provides the image recording material, wherein the function-controlling layer has a function of controlling light resistance, and the function-controlling layer comprises at least one of an UV absorber and an antioxidant.

A eighth aspect of the present invention provides the image recording material, wherein a protective layer is disposed on the surface of the image-receiving layer.

A ninth aspect of the present invention provides a protective film comprising at least a transparent substrate, an image-receiving layer for forming an image by an electrophotographic system are disposed on one side of the substrate, and a function controlling means disposed on the other side of the substrate, wherein the image-receiving layer include a polyester resin which comprises a structural unit represented by the structural formula (I) and which has a number average molecular weight of 12,000 to 45,000:

Structural formula (I)

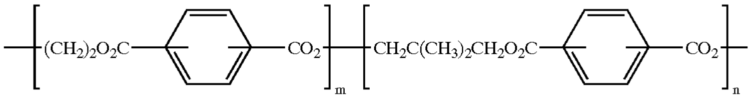

wherein n and m represent integers such that a molar ratio n/m is from 1 to 9.

A tenth aspect of the present invention provides the protective film, wherein the image-receiving layer further comprises a charge controlling agent.

A eleventh aspect of the present invention provides the protective film, wherein the charge controlling agent is a surfactant.

A twelfth aspect of the present invention provides the protective film, wherein the function controlling means comprises a function-controlling layer for controlling at least one function selected from gloss, microbial resistance, flame retardancy, light resistance and chargeability.

A thirteenth aspect of the present invention provides the protective film, wherein the function-controlling layer has a function of controlling gloss, and the function-controlling layer comprises a resin and a filler.

A fourteenth aspect of the present invention provides the protective film, wherein the function-controlling layer has a function of controlling microbial resistance, and the function-controlling layer comprises an inorganic antimicrobial agent.

A fifteenth aspect of the present invention provides the protective film, wherein the function-controlling layer has a function of controlling light resistance, and the function-controlling layer comprises at least one of a UV absorber and an antioxidant.

A sixteenth aspect of the present invention provides the protective film, wherein a protective layer is disposed on the surface of the image-receiving layer.

A seventeenth aspect of the present invention provides the image display material comprising at least a transparent substrate, an image-receiving layer for forming an image by an electrophotographic system are disposed on one side of the substrate, and a function controlling means disposed on the other side of the substrate, wherein the image-receiving layer include a polyester resin which comprises a structural unit represented by the structural formula (I) and which has a number average molecular weight of 12,000 to 45,000:

Structural formula (I)

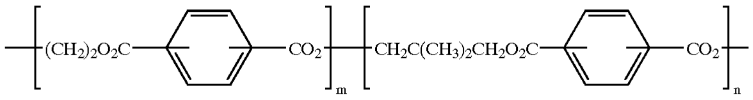

wherein n and m represent integers such that a molar ratio n/m is from 1 to 9.

DETAILED DESCRIPTION OF THE PREFERRED EMBODIMENTS

Figure 1:
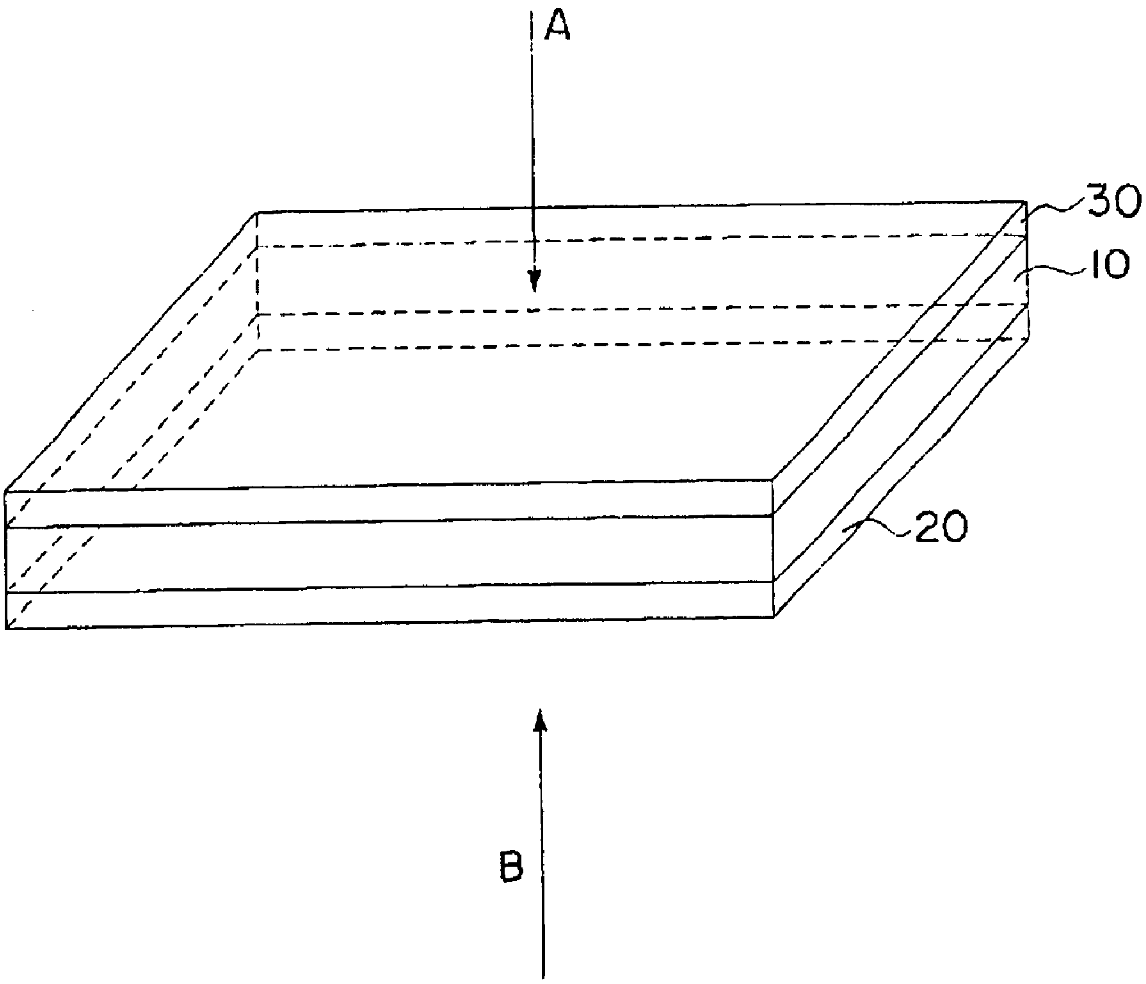
FIG. 1 is a schematically perspective view showing an embodiment of the image recording material of the present invention.

Hereinafter, one embodiment of the present invention is described in more detail by reference to the drawing. FIG. 1 is a schematically perspective view showing an embodiment of the image recording material of the invention. As shown in FIG. 1, the image recording material is composed of a substrate 10, an image-receiving layer 20 and a function controlling means 30. In FIG. 1, the function controlling means 30 is shown to have a layered structure, but is not limited to this shape, and the surface of the substrate 10 may be provided directly with the function controlling means 30 by mechanical treatment.

The image recording material of the invention has a structure wherein a reverse image (mirror image) is formed on an image-receiving layer provided on one side of a transparent substrate such that when the image is viewed through the substrate, the image is seen as a normal rotation image (normal image) on the surface of the image-receiving layer, while the surface (the other side of the substrate) on which the reverse image is not formed is provided with a regulation-controlling means. That is, as shown in FIG. 1, the image is formed on the surface of the image-receiving layer 20 at the side indicated by the arrow B, while the function controlling means 30 is disposed on the surface at the side indicated by the arrow A, and the image is to be seen at the side indicated by the arrow A. According to the image-recording material, the substrate 10 is provided with the image-receiving layer 20, and the surface on which the image is formed (referred to-hereinafter as image surface) is different from the surface on which the function controlling means 30 is disposed (referred to hereinafter as controlling surface), and thus various functions can be regulated without adversely affecting the qualities of the formed image.

The substrate 10 usable in the image recording material of the invention should have transparency. As used herein, the term "transparency" refers for example to a property permitting a light in the visible light range to penetrate to a certain degree, and in the invention, an formed image may be transparent at least to such a degree as to be observed through the substrate 10.

As the substrate 10, a plastic film is typically used. In particular, a light-permeable film usable in OHP includes, for example, an acetate film, triacetate cellulose film, nylon film, polyester film, polycarbonate film, polystyrene film, polyphenylene sulfide film, polypropylene film, polyimide film and cellophane, and at present, the polyester film is often used from the comprehensive view of mechanical, electrical, physical and chemical characteristics and processability, and in particular a biaxially oriented polyethylene terephthalate film is often used.

As the substrate 10, it is possible to use not only the plastic film described above but also a resin having transparency or ceramics having transparency, to which a pigment or a dye may be added. The substrate 10 may be in a film or plate form and may have such thickness as to be free from flexibility or to have the strength necessary for the substrate 10.

It is essential that the image-receiving layer 20 comprise, as a binder, a polyester resin (also referred to hereinafter as specified polyester resin) having a number average molecular weight of 12,000 to 45,000 composed of a unit represented by the structural formula (I):

Structural formula (I)

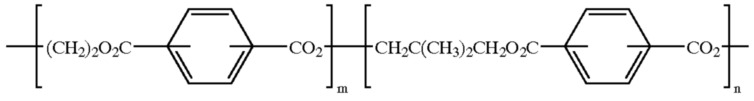

In the structural formula (I), n and m represent integers such that a molar ratio n/m is from 1 to 9, more preferably 1.2 to 3.0, still more preferably 1.4 to 2.3. When n/m is less than 1, the synthesized polyester resin has a problem with deterioration in light resistance. When PET film is used as the substrate 10 while an additive is added to the image-receiving layer 20, there is a problem with deterioration in the adhesion of the substrate 10 to the image-receiving image 20. On the other hand, when n/m is higher than 9, there is a limit to the solvent in which the polyester resin is to be dissolved, so the polyester resin may be insoluble in a solvent suitable for coating, to make subjection thereof to usual coating/surface treatment impossible in some cases.

It is essential that the number average molecular weight of the polyester resin represented by the structural formula (I) above is from 12,000 to 45,000, more preferably in the range of 18,000 to 30,000, still more preferably in the range of 22,000 to 26,000. When the number average molecular weight is less than 12,000, there is a problem that the softening point of the resin, even satisfying the above ratio of n/m ranging from 1 to 9, is decreased to permit the resin to exhibit viscosity even at ordinary temperatures. On the other hand, when the number average molecular weight is higher than 45,000, there is a problem that the softening point of the resin becomes too high, resulting in a deterioration in the fixation of an image (toner).

The glass transition point (Tg) of the polyester resin represented by the structural formula (I) above is preferably in the range of 55 to 95° C., more preferably in the range of 60 to 75° C.

The polyester resin represented by the structural formula (I) above is synthesized from terephthalic acid and isophthalic acid as polyvalent carboxylic acid components, and ethylene glycol and neopentyl glycol as polyvalent hydroxy compounds. According to the structural formula (I), the left structural unit is composed of terephthalic acid or isophthalic acid and ethylene glycol, while the right structural unit is composed of terephthalic acid or isophthalic acid and neopentyl alcohol. Accordingly, when the polyester resin represented by the structural formula (I) above is synthesized, the molar ratio of neopentyl glycol to ethylene glycol should be regulated in the range of 1 to 9, in order to allow n/m to be in the range of 1 to 9 (molar ratio) described above.

A method of synthesizing the specified polyester resin used in the invention is exemplified in JP-A 50-100123 etc.

The image-receiving layer 20 can make use of another polyester resin in combination with the specified polyester resin to such an extent that the effect of the invention is not deteriorated. As the polyester resin which can be used in combination, a polyester resin referred to as one of hot-melt resins constituting a gloss-controlling layer described later can be used.

Preferably, the image-receiving layer 20 incorporates a charge controlling agent such as a surfactant, an electroconductive inorganic oxide, or a polymeric electroconductive agent, in order to secure the necessary surface resistance of the image recording material in the electrophotographic system.

For example, when a plastic film is used as the substrate 10, the image-receiving layer 20 preferably has a surface resistance in the range of $1\times10^8$ to $1\times10^{15}$ Ω (under the conditions of 25° C., 65% RH) in order to prevent image deterioration caused by the environment such as temperature and humidity. The method of changing surface resistance can be achieved by adding a predetermined amount of a charge controlling agent such as a surfactant, fine electroconductive oxide particles and a polymeric electroconductive agent to the image-receiving layer 20. The method of adding the charge controlling agent is, for example, a method of spraying a surfactant dispersed in water onto the image-receiving layer 20 so as not to destroy the layer.

The surfactant used as the charge controlling agent includes, for example, cationic charge controlling agents such as polyamines, ammonium salts, sulfonium salts, phosphonium salts and betaine type amphoteric salts, anionic charge controlling agents such as alkyl phosphates, and nonionic charge controlling agents such as fatty esters. Among these charge controlling agents, the cationic charge controlling agents interacting highly with a negatively charged toner for recent electrophotography are preferably used for their effectiveness in an improvement in transferability.

Among these cationic charge controlling agents, quaternary ammonium salts are preferable. The quaternary ammonium salts are preferably those compounds having a structure represented by the general formula (II):

General formula (II)

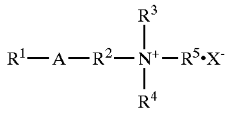

In the general formula (II) above, $R^1$ represents a $C_{6-22}$ alkyl group, alkenyl group or alkynyl group, $R^2$ represents a $C_{1-6}$ alkyl group, alkenyl group or alkynyl group. $R^3$, $R^4$ and $R^5$ may be the same or different and represent an aliphatic group, aromatic group or heterocyclic group. The aliphatic group refers to a linear, branched or cyclic alkyl, alkenyl or alkynyl group. The aromatic group refers to a single benzene ring or condensed polycyclic aryl group. These groups may have substituent groups such as hydroxyl group. A represents an amide linkage, ether linkage, ester linkage or phenyl group, but may be absent. $X^-$ represents a halogen element, sulfate ion or nitrate ion, and these ions may have a substituent group. Further, the content of the quaternary ammonium salts as the surfactant is preferably 0.1 to 15% by weight, more preferably 0.5 to 5% by weight, based on the specified polyester resin. When the content is less than 0.1% by weight, the desired surface resistance cannot be achieved. When the content is too high, the surfactant may be deposited on the surface of the coating layer to cause secondary hindrance.

The material of the fine electroconductive metal oxide particles used as the charge controlling agent includes ZnO, TiO, $TiO_2$, $SnO_2$, $Al_2O_3$, $In_2O_3$, Sio, $SiO_2$, MgO, BaO and $MoO_3$. These materials may be used alone, or their composite oxide may also be used. Other elements are preferably contained in these metal oxides; for example, Al, In etc. are preferably contained in (doped with) ZnO; Nb, Ta etc. in TiO; and Sb, Nb, halogen elements etc. in $SnO_2$. Among these materials, $SnO_2$ doped with Sb is particularly preferable because of high stability and less change in electrical conductance with time.

The polymeric electroconductive agent used as the charge controlling agent includes polyamide, block polymers of polyamide with polyether, and polyaniline.

The image-receiving layer 20 preferably incorporates a matting agent for improving the transferability of the image recording material required in the electrophotographic system.

As the matting agent, a resin having lubricating properties is used, and examples thereof include polyolefin resins such as polyethylene, and fluorine resins such as polyvinyl fluoride, polyvinylidene fluoride, and polytetrafluoroethylene (PTFE). Among these, the fluorine resins, specifically a dispersion of polytetrafluoroethylene (PTFE), are preferably used.

The matting agent includes low-molecular polyolefin wax (e.g., polyethylene wax), high-density polyethylene wax, paraffin or microcrystalline wax. Among these materials, the low-molecular polyolefin wax (generally a molecular weight of 1,000 to 5,000) is preferable.

In addition to the materials described above, fine inorganic particles (e.g., $SiO_2$, $Al_2O_3$, talc or kaolin) and bead-shaped plastic powder (examples of the material: crosslinked PMMA, polycarbonate, polyethylene terephthalate or polystyrene) may be used singly or in combination thereof.

The volume average particle diameter of the matting agent in the resin is preferably in the range of 0.1 to 10 μm, particularly preferably in the range of 1 to 5 μm. The volume average particle diameter is preferably greater, but when the particle diameter is too great, the matting agent is removed from the image-receiving layer 20 to generate a phenomenon called "powder drop", so that the surface is easily damaged by abrasion and its haze is increased, and therefore, the range defined above is preferable.

The matting agent is preferably flat-shaped. A previously flat matting agent may be used, or a matting agent having a relatively low softening temperature may be applied onto the image-receiving layer 20 and made flat by heating at the time of drying or by pressing under heating. However, the matting agent is protruded preferably convexly from the surface of the image-receiving layer 20.

The content of the matting agent is preferably 0.1 to 10% by weight, more preferably 0.5 to 5% by weight, based on the specified polyester resin. When the content of the matting agent is less than 0.1% by weight, a function of improving transferability may hardly be exhibited. On the other hand, when the content is higher than 10% by weight, the haze may be increased to reduce transparency. Further, the coefficient of friction is often lowered, and therefore such a high content is uneconomical in some cases.

Preferably the image-receiving layer 20 incorporates natural wax or synthetic wax which is a material poor in adhesion to the fixing member or a release agent such as a release resin, a reactive silane compound or a modified silicone oil in order to prevent adhesion or sticking onto the fixing member during fixation of an image.

Examples of the natural wax and synthetic wax include natural wax such as carnauba wax, beeswax, montan wax, paraffin wax and microcrystalline wax, and synthetic wax such as low-molecular polyethylene wax, low-molecular polyethylene oxide wax, low-molecular polypropylene wax, low-molecular polypropylene oxide wax, higher fatty acid wax, higher fatty ester wax and sazole wax, and these may be used alone or in combination thereof.

The release resin includes silicone resin, fluorine resin, or modified silicone resin of silicone resin with various kinds of resin, for example, polyester modified silicone resin, urethane modified silicone resin, acryl modified silicone resin, polyimide modified silicone resin, olefin modified silicone resin, ether modified silicone resin, alcohol modified silicone resin, fluorine modified silicone resin, amino modified silicone resin, mercapto modified silicone resin and carboxy modified silicone resin, as well as heat-curable silicone resin and photo-curable silicone resin.

Such modified silicone resin has high affinity for a toner-forming resin as the image forming material or for a resin composed of the hot-melt resin in the invention, is suitably miscible and compatible with the resin, is miscible by melting with the resin, and is thus excellent in coloration of a pigment contained in the toner, and because of the releasability of the silicone resin, the image-recording material is prevented from adhering to the fixing member at the time of heat melting.

The reactive silane compound and modified silicone oil can be added to achieve lower adhesion to the fixing member. The reactive silane compound, while reacting with the specified polyester resin in the image-receiving layer 20, reacts with the modified silicone oil so that the two components function as a release agent superior to the silicone oil as a liquid lubricant, and are strongly fixed by curing reaction as the release agent in the image-receiving layer 20, and the release agent will not removed even by mechanical abrasion or solvent extraction, thus preventing the image-recording material from adhering to the fixing member at the time of heat melting.

The wax or the release agent is added preferably to the specified polyester resin and utilized after incorporation in a state dispersed in and compatible with the specified polyester resin.

In the invention, the image-receiving layer 20 is formed by dissolving the polyester resin of structural formula (I) in a suitable solvent and if necessary mixing the above-described additives therewith to prepare a coating solution, followed by coating the coating solution onto the image surface of a suitable substrate 10 or dipping the substrate in the coating solution. The coating or dipping method includes methods known in the art, such as blade coating, (wire) bar coating, spray coating, dipping coating, bead coating, air knife coating, curtain coating and roll coating.

The resulting coating may be air-dried, but easily dried by heat drying. As the drying method, a known method such as a method of placing the coating in an oven, passing it through an oven or contacting it with a heating roller is used.

The function controlling means 30 is disposed on the controlling surface of the substrate 10 in order to confer and/or improve various functions such as gloss, light resistance, microbial resistance, chargeability, heat resistance, flame retardancy, electrical conductance, humidity resistance, water repellency, abrasion resistance and mar resistance. Thus, the image-recording medium having the function controlling means 30 can have resistance under various conditions. Accordingly, when the image recording material of the invention is used, the function controlling means 30 is disposed on a position where it is most liable to the influence of the environment, whereby the resistance possessed by the function controlling means 30 can be exhibited more excellently.

Hereinafter, the regulation of gloss, light resistance, chargeability, microbial resistance, heat resistance and flame retardancy by the function controlling means 30 is described, but the invention is not limited thereto.

Regulation of Gloss

The regulation of gloss is conducted so as to prevent the "roughness" of an image formed on the image surface of the substrate 10, to improve visibility when viewed in any directions. The function controlling means 30 for controlling gloss may be composed of a gloss-controlling layer provided on the controlling surface of the substrate 10, for example as shown in FIG. 1, or the controlling surface of the substrate 10 may be subjected directly to mechanical treatment for controlling gloss to confer a gloss-controlling function on the substrate 10.

As the method of subjecting the controlling surface of the substrate 10 directly to mechanical treatment for controlling gloss, there is a method of providing the controlling surface of the substrate 10 with unevenness by a mechanical means. Once the controlling surface of the substrate 10 is provided with unevenness, light scattering occurs on the controlling surface of the substrate, and the treatment for desired gloss can be conducted by changing the size, roughness and depth of unevenness. As the mechanical means, known methods of mechanical surface treatment, such as sandblasting, embossing, plasma etching etc. can be used.

Sandblasting is a method of roughing the surface of a material by blasting the surface successively with abrasive grains of indefinite or definite shape, such as organic resin, ceramics and metal. Embossing is a method wherein a material is contacted with a mold previously provided with unevenness, to transfer the unevenness of the mold to the surface of the material. Plasma etching is a method of etching with excited molecules, radicals and ions generated by dissociation of molecules with plasma discharge. The etching proceeds through evaporation of a vaporizable compound formed by reaction of the resultant excited species with a material.

When the gloss-controlling means for controlling gloss is constituted as a gloss-controlling layer, the gloss-controlling layer can be formed by utilizing the phase separation of the polymer. The resin forming the gloss-controlling layer is allowed to incorporate a resin incompatible therewith to generate phase separation during drying thereby providing the surface of the layer with unevenness. By changing the type and amount of the incompatible resin and drying conditions, the state of phase separation can be changed, whereby the unevenness on the surface of the layer can be regulated, and as a result, the gloss of the controlling surface can be regulated.

In another embodiment wherein the gloss-controlling means for controlling gloss is constituted as a gloss-controlling layer, the gloss-controlling layer may be composed at least of a resin and fillers. The resin is composed preferably of the hot-melt resin used in the image forming material (toner) from the viewpoint of affinity for the substrate, selection from a diversity of materials, stability, costs, and easiness of the process. The thickness of the gloss-controlling layer is preferably 0.01 to 20 μm for stability in formation of the coating, more preferably 0.1 to 5 μm for stable inclusion of fillers and for securing adhesion to the substrate.

The hot-melt resin is not particularly limited insofar as it is used as an image forming material, and examples thereof include homopolymers or copolymers obtained by polymerizing one or more monomers, for example styrene or styrene derivatives such as vinyl styrene and chlorostyrene; monoolefins such as ethylene, propylene, butylene and isobutylene; vinyl esters such as vinyl acetate, vinyl propionate, vinyl benzoate and vinyl butyrate; α-unsaturated fatty monocarboxylates such as methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers such as vinyl methyl ether, vinyl ethyl ether and vinyl butyl ether; vinyl ketones such as vinyl methyl ketone, vinyl hexyl ketone and vinyl isopropenyl ketone; diene type monomers such as isoprene and 2-chlorobutadiene. Among these monomers, styrene or derivatives thereof, α-unsaturated fatty monocarboxylates are preferably used. Further, the polyester resin, polyurethane resin etc. may be used alone or as a mixture thereof.

As the hot-melt resin usable in the invention, polyester can also be preferably used. The polyester can be produced by reacting a polyvalent hydroxy compound with a polybasic carboxylic acid or a reactive acid derivative thereof. The polyvalent hydroxy compound constituting the polyester includes, for example, diols such as ethylene glycol, diethylene glycol, triethylene glycol, 1,2-propylene glycol, 1,3-propylene glycol and 1,4-butane diol; bisphenol A alkylene oxide adducts such as hydrogenated bisphenol A, polyoxyethylenated bisphenol A and polyoxypropylenated bisphenol A; and other divalent alcohols and divalent phenols such as bisphenol A. The polybasic carboxylic acid includes, for example, malonic acid, succinic acid, adipic acid, sebacic acid, alkyl succinic acid, maleic acid, fumaric acid, mesaconic acid, citraconic acid, itaconic acid, glutaconic acid, cyclohexane dicarboxylic acid, phthalic acid, isophthalic acid, terephthalic acid, other divalent carboxylic acids, or reactive acid derivatives thereof such as acid anhydrides, alkyl esters and acid halides. In addition to these divalent hydroxy compounds and carboxylic acids, polyvalent (trivalent or more) hydroxyl compounds and/or polybasic (tribasic or more) carboxylic acids may be added for non-linearization of the polymer to such an extent as not to form insoluble tetrahydroxy furan. Among these polyesters, a linear polyester resin consisting of a polycondensate based on bisphenol A and an aromatic polyvalent carboxylic acid as the monomers can be particularly preferably used. The polyester resin which can be particularly preferably used has the following physical properties: the softening temperature is in the range of 90 to 150° C.; the glass transition temperature, 50 to 100° C.; the number average molecular weight, 2,000 to 10,000; the weight average molecular weight, 8,000 to 15,000; the acid value, 5 to 30; and the hydroxyl value, 5 to 40.

The resin constituting the gloss-controlling layer may be composed of a hardening resin such as heat-curable resin, photo-curable resin or electron radiation curing resin in order to improve the strength of its coating.

The heat-curable resin includes known resins to be cured (insolubilized) usually upon heating. Examples thereof include a phenol-formaldehyde resin, an urea-formaldehyde resin, a melamine-formaldehyde resin, a resin of acryl polyol cured with an isocyanate, a resin of polyester polyol cured with melamine, and a resin of acrylic acid cured with melamine. Further, monomers that are elements of the heat-curable resin may be used in combination.

In addition, any thermoplastic resins cured by crosslinking and having heat resistance are included in the heat-curable resin in the invention. As the heat-curable resin, for example, a heat-curable acryl resin is preferably used. The heat-curable acryl resin is produced by crosslinking, with a melamine type compound or an isocyanate type compound, a copolymer prepared by polymerizing at least one kind of acrylic monomer, or an acrylic monomer with a styrene type monomer. As the acrylic monomer, use can be made of, for example, alkyl esters such as methyl methacrylate, butyl methacrylate, octyl methacrylate and stearyl methacrylate; alkyl acrylates such as ethyl acrylate, propyl acrylate, butyl acrylate and octyl acrylate; acrylonitrile; acrylamide; and vinyl monomers containing an amino group, such as dimethylaminoethylester methacrylate, diethylaminoethyl methacrylate, dimethylaminoethyl acrylate and dimethylaminopropyl methacrylamide, and as the styrene type monomer, use can be made of styrene, α-methylstyrene, vinyltoluene, p-ethylstyrene etc.

A heat-curable silicone resin is also preferable. Generally the silicone resin is classified, depending on the molecular structure, into silicone resin having a linear structure serving as a material of silicone oil and silicone rubber, and silicone resin having a three-dimensionally crosslinked structure. Various properties such as releasability, adhesion, heat resistance, insulation and chemical stability are determined by molecules (organic molecules) bound to the silicon atoms, the degree of polymerization, etc. The hardening silicone resin usable in the invention is a silicone resin having a three-dimensionally crosslinked structure as described above. The silicone resin having a three-dimensionally crosslinked structure has a crosslinked structure which is polymerized usually from multifunctional (trifunctional, tetrafunctional) units.

The above silicone resin having a linear structure has a low molecular weight, and includes silicone oil utilized as an insulating oil, a liquid coupling agent, a buffering oil, a lubricating oil, a heating medium, a water repellant, a surface treating agent, a release agent or a deforming agent and silicone rubber having a molecular weight (siloxane unit) of about 5000 to 10000 polymerized by heat-curable in the presence of a vulcanizing agent etc., but these are not suitable as the hardening silicone resin described above.

Depending on the molecular-weight unit, the hardening silicone resin is classified into relatively lower-molecular silicone varnish soluble in an organic solvent, and highly polymerized silicone resin. Further, the hardening silicon resin is also classified into condensation type, addition type and radiation type (UV-curing type, electron radiation curing type etc.), depending on the curing reaction in the forming stage. Further, the hardening silicon resin is classified into solvent type, non-solvent type etc., depending on the application form.

The curing conditions include the type of reactive group, the number of reactive groups, curing time, temperature, irradiation energy etc. The method of controlling the curing conditions includes, for example, a method of adding mono- or bifunctional polydimethyl siloxane, a reaction inhibitor (acetylene alcohols, cyclic methyl vinyl cyclosiloxane, siloxane-modified acetylene alcohols etc.) etc. or a method of controlling the amount of a catalyst, reaction temperature, reaction time, intensity of UV irradiation, etc. By controlling these curing conditions, the molecular weight of the hardening silicone resin, the amount of remaining silanol as the reactive group, etc. can be regulated, and thus the releasability, hardness, adhesion, surface hardness, transparency, heat resistance, chemical stability etc. can be arbitrarily regulated.

At the stage of curing the hardening silicone resin, strong bonding is formed between the substrate and the hardening silicone resin. Accordingly, the gloss-controlling layer formed on the substrate has excellent adhesive strength to the substrate and is thus not released from the substrate.

The photo-curable resin composition includes, for example, a composition based on a compound (including not only a low-molecular compound but also a polymer) having a reactive double bond such as vinyl group in the molecule, an initiator necessary for photo-curable, a protective layer for the sublayer (coloring layer, or the substrate layer depending on the case), for example a UV absorber, and if necessary a sheet retention-improving polymer, for example a resin.

The electron radiation curing resin composition is for example a composition based on a compound having a reactive double bond such as vinyl group in the molecule, a sublayer-protecting material (UV absorber) and if necessary a resin. The compound having a reactive double bond in the molecule includes compounds having a (meth)acryloyl group, for example those of monofunctional type such as methyl (meth)acrylate, ethyl (meth)acrylate, benzyl (meth) acrylate, 2-ethoxyethyl (meth)acrylate and phenoxy diethylene glycol (meth)acrylate, and those of multifunctional type such as 1,6-hexanediol di(meth)acrylate, neopentyl glycol di(meth)acrylate, polyethylene glycol di(meth) acrylate, polypropylene glycol di(meth)acrylate, trimethylpropane tri(meth)acrylate, pentaerythritol tri(meth)acrylate, pentaerythritol tetra(meth)acrylate and dipentaerythritol hexa(meth)acrylate. Further, oligomers such as polyester acrylate, polyurethane acrylate, epoxy acrylate, polyether acrylate, oligoacrylate, alkyd acrylate, and polyol acrylate can also be mentioned. Furthermore, compounds having a vinyl group or allyl group, such as styrene monomer, α-methylstyrene, divinylstyrene, vinyl acetate, pentene, hexene, unsaturated compounds etc. can also be mentioned To improve the adhesion of the gloss-controlling layer or compatibility with the sublayer-protecting material, these compounds may have introduced polar groups such as hydroxyl group, amino group, carboxyl group, carbonyl group and epoxy group.

The photo-curable polymerization initiator is added for curing particularly with UV rays. This polymerization is usually called a photo-initiator, and for example a photo-initiator based on benzoin alkyl ether, acetophenone, benzophenone or thioxanthone is preferably used. The benzoin ether-based initiator includes benzyl, benzoin, benzoin methyl ether, benzoin ethyl ether, benzoin propyl ether etc. The acetophenone-based initiator includes 2,2'-diethoxy acetophenone, 2-hydroxy-2-methyl propiophenone, p-tert-butyl trichloroacetophenone, 2,4,6-trimethylbenzoyldiphenyl phosphine oxide etc. The benzophenone-based initiator includes benzophenone, 4-chlorobenzophenone, 4,4'-dichlorobenzophenone, 3,3'-dimethyl-4-methoxy benzophenone, dibenzosuberenon etc. The thioxanthone-based initiator includes thioxanthone, 2-chlorothioxanthone, 2-methyl thioxanthone, 2-isopropyl thioxanthone, 2-ethyl anthraquinone etc.

The photo-initiator is added in the range of 0.05 to 10 parts by weight, preferably 0.1 to 5 parts by weight, based on 100 parts by weight of the compound having a reactive double bond. The photo-initiators may be used alone or in combination thereof.

As the sublayer-protecting material, a commercial UV absorber and the like can be used. The material to be added is selected from those excellent in dispersion stability in the composition without undergoing deformation upon irradiation with light. For example, the sublayer-protecting material includes salicylate type materials such as phenyl salicylate, p-tert-butyl phenyl salicylate and p-octyl phenyl salicylate, benzophenone type materials such as 2,4-dihydroxybenzophenone, 2-hydroxy-4-methoxy benzophenone, 2-hydroxy-4-octoxy benzophenone and 2-hydroxy-4-dodecyloxy benzophenone, benzotriazole type materials such as 2-(2'-hydroxy-5'-methylphenyl) benzotriazole, 2-(2'-hydroxy-5'-tert-butylphenyl) benzotriazole and 2-(2'-hydroxy-3'-tert-butyl-5'-methylphenyl)-5-chlorobenzotriazole, and cyanoacrylate type materials such as 2-ethylhexyl-2-cyano-3,3'-diphenyl acrylate and ethyl-2-cyano-3,3'-diphenyl acrylate.

The UV absorber is added in the range of 0.01 to 3 parts by weight, preferably 0.1 to 2 parts by weight, based on 100 parts by weight of the compound having a reactive double bond. Further, it is more preferable to use two or more UV absorbers than a single absorber in order to improve protection of the sublayer.

Further, a hindered amine-based light stabilizer and an antioxidant may be added. A polymer selected as the sheet retention improving material is free of a reactive double bond to be added for improvement of sheet handling (flexibility) and improvement of tack of a sheet surface and is excellent in compatibility with the compound having a double bond. For example, when the compound having a double bond has a urethane skeleton with a (meth)acryloyl group, an acryl resin made of methyl methacrylate, a polyester resin or an urethane resin can be used. There are criteria and SP (solubility parameter) for selection of the polymer, and a combination of materials similar in such values is preferable. As the polymer, fluorine resin, silicon resin etc. are also used.

Polar groups such as hydroxyl group, amino group, carboxyl group, carbonyl group and epoxy group may be added to these polymers in order to improve adhesion of the gloss-controlling layer and compatibility with the sublayer protecting material. A peroxide can be added if necessary to the gloss-controlling layer. As the peroxide, a usual organic peroxide can be used. For storage stability at ordinary temperatures, the peroxide is preferably an organic peroxide having a decomposition temperature of 100° C. Examples thereof include 2,2-bis(tert-butylperoxy) butane, tert-butylperoxy benzoate, di-tert-butylperoxy isophthalate, methyl ethyl ketone peroxide, dicumyl peroxide and tert-butyl peroxyacetate. The amount of the peroxide added is preferably in the range of 0.5 to 5.0 parts by weight relative to 100 parts by weight of the above-mentioned low-molecular compound having a (meth) acryloyl group. These peroxides may be used alone or in combination thereof. By adding these peroxides, a portion hardly cured by light irradiation can be thermally cured.

In the resin constituting the gloss-controlling layer, a water-soluble binder may be used in place of the resin described above. The water-soluble binder includes water-soluble polymers such as oxidized starch, phosphorylated starch, cationic starch, self-denatured starch and various kinds of modified starch, polyethylene oxide, polyacrylamide, sodium polyacrylate, sodium alginate, hydroxyethyl cellulose, methyl cellulose, polyvinyl alcohol or derivatives. These water-soluble polymers can be used as a mixture thereof depending on the purpose.

If necessary, a small amount of a pigment such as a pigment, dye etc., or fine particles of highly hard materials for increasing hardness are added to the gloss-controlling layer. As the pigment, a pigment and dye used in coatings can be used. The pigment includes titanium oxide, iron oxide, carbon black, cyanine type pigments and quinacridone type pigments. The dye includes azo type dyes, anthraquinone type dyes, indigoid type dyes and stilbene type dyes. Further, alumina flakes and metal powder such as nickel powder, gold powder and silver powder may be used as the pigment. The particles of these materials are preferably as fine as possible. As the material for increasing hardness, fine particles (volume average particle diameter: 20 nm or less) of titanium oxide, silica, diamond etc. are used if necessary. When these pigments are added, the photo-initiator is preferably the one initiating the reaction by lights of wavelengths less adsorbed by the pigments.

Hereinafter, a combination of mainly acrylic materials is shown below. The materials in other systems can also be similarly combined.

A photo-curable gloss-controlling layer based on (a) acryl resin having a weight average molecular weight of 20,000 to 1,000,000 and being solid at ordinary temperatures, (b) a low-molecular compound having a double bond in the molecule, and (c) a photo-initiator. A photo-curable gloss-controlling layer based on (a) acryl resin having, in the molecule, a plurality of functional groups of at least one kind selected from the group consisting of a hydroxyl group, an amino group and a carboxyl group and having a weight average molecular weight of 20,000 to 1,000,000, (b) a low-molecular compound having a double bond in the molecule, (c) a photo-initiator, and (e) at least one kind of crosslinking agent selected from the group consisting of an isocyanate type crosslinking agent, a melamine type crosslinking agent and an epoxy type crosslinking agent. A photo-curable gloss-controlling layer based on (f) acryl resin having a plurality of reactive double bonds in the molecule, having a weight average molecular weight of 20,000 to 1,000,000 and being solid at ordinary temperatures, (b) a low-molecular compound having a double bond in the molecule, and (c) a photo-initiator. A photo-curable gloss-controlling layer based on (g) acryl resin having, in the molecule, a plurality of reactive double bonds and a plurality of functional groups of at least one kind selected from the group consisting of a hydroxyl group, an amino group and a carboxyl group, having a weight average molecular weight of 20,000 to 1,000,000 and being solid at ordinary temperatures, (b) a low-molecular compound having a double bond in the molecule, (c) a photo-initiator, and (e) at least one kind of crosslinking agent selected from the group consisting of an isocyanate type crosslinking agent, a melamine type crosslinking agent and an epoxy type crosslinking agent.

For example, the electron radiation curing gloss-controlling layer makes use of the composition of the photo-curable gloss-controlling layer from which the photo-initiator was removed.

(a) Acryl resin having a weight average molecular weight of 20,000 to 1,000,000 and being solid at ordinary temperatures, contained in the gloss-controlling layer, can be obtained by copolymerizing (meth)acrylate such as methyl (meth)acrylate, ethyl (meth)acrylate or butyl (meth) acrylate with a styrene-derived monomer or a maleic acid type monomer in the presence of a reaction initiator (various peroxides, chain transfer agents etc.).

(d) Acryl resin having, in the molecule, a plurality of functional groups of at least one kind selected from the group consisting of a hydroxyl group, an amino group and a carboxyl group, having a weight average molecular weight of 20,000 to 1,000,000 and being solid at ordinary temperatures, contained in the gloss-controlling layer, can be obtained by copolymerizing e.g. a monomer having at least one kind of functional group selected from a (meth) acrylate monomer having a carboxyl group, such as (meth) acrylate, a (meth)acrylate monomer having a hydroxyl group, such as 2-hydroxyethyl (meth)acrylate and 4-hydroxybutyl (meth)acrylate, and a (meth)acrylate monomer having an amino group, such as 2-aminoethyl (meth) acrylate and 3-aminopropyl (meth)acrylate, with another (meth)acrylate, a styrene-derived monomer or a maleic acid type monomer in the presence of a reaction initiator (various peroxides, chain transfer agents etc.).

(f) Acryl resin having a plurality of (meth)acryloyl groups in the molecule, having a weight average molecular weight of 20,000 to 1,000,000 and being solid at ordinary temperatures and (g) acryl resin having, in the molecule, a plurality of (meth)acryloyl groups and a plurality of functional groups of at least one kind selected from the group consisting of a hydroxyl group, an amino group and a carboxyl group, having a weight average molecular weight of 20,000 to 1,000,000 and being solid at ordinary temperatures, contained in the gloss-controlling layer, can be obtained by copolymerizing e.g. a monomer having at least one kind of functional group selected from (math)acrylic acid having a carboxyl group, such as (meth) acrylic acid; a (meth) acrylate monomer having a hydroxyl group, such as 2-hydroxyethyl (meth)acrylate and 4-hydroxybutyl (meth) acrylate; a (meth)acrylate monomer having an amino group, such as 2-aminoethyl (meth)acrylate and 3-aminopropyl (meth)acrylate; a (meth)acrylate monomer having aziridinyl, such as 2-(1-aziridinyl)ethyl(meth)acrylate and 2-(2-aziridinyl)butyl(meth)acrylate; and a (meth)acrylate monomer having an epoxy group, such as glycidyl (meth) acrylate, with another (meth)acrylate, a styrene-derived monomer or a maleic acid type monomer in the presence of a reaction initiator (various peroxides, chain transfer agents etc.), to produce an acrylic copolymer having functional groups, followed by adding a monomer having the above-described functional monomer to the acrylic copolymer.

The weight average molecular weight (Mw) of the acryl resins (a), (d), (f) and (g) can be changed depending on conditions for the polymerization reaction using a reaction initiator. The acryl resin used in the invention is preferably the one having a weight average molecular weight in the range of 20,000 to 1,000,000. When the weight average molecular weight is lower than 20,000, sufficient elongation cannot be achieved for stretching at the time of the operation of attaching the sheet, and cracking may occur. When the weight average molecular weight is higher than 1,000,000, the resin is hardly dissolved in a solvent, thus making it difficult to produce the coating sheet from the photo-curable resin composition. For example, when the sheet is prepared by solvent casting, the solvent viscosity is increased so that the resin cannot be cast except at a low concentration, thus making it difficult to increase the thickness of the sheet.

From the relationship of hardness of the sheet after curing with mar resistance, the Tg (glass transition point) of the acryl resin is preferably in the range of −20° C. to 100° C. However, when the surface hardness is not so high, for example 2B or less (23° C.) in terms of pencil hardness, or when elongation of the sheet is scarcely required, the glass transition point may be outside of the above range. The acryl resin may be a combination of different kinds of acryl resins insofar as they have a molecular weight in the range defined above. The acryl resins (d) and (g) have functional groups such as hydroxyl group, amino group and carboxyl group and are thus crosslinked with the crosslinking agent, whereby the flexibility of the resulting sheet can be improved.

The sum of the functional group values of the acryl resin (d) or (g) {OH value and $NH_2$ value ($NH_2$: the amount of $NH_2$ groups added at the time of polymerization was calculated in the same manner as for OH value, or quantified by converting the $NH_2$ groups into OH groups by reaction with nitrous acid) and COOH value (COOH value: the amount of COOH groups added at the time of polymerization was calculated in the same manner as for OH value, or quantified by titration of the COOH groups with KOH)}is preferably in the range of 2 to 50. When the functional group value is less than 2, an improvement in flexibility of the resulting sheet cannot be expected. On the other hand, when the functional group value is higher than 50, sufficient elongation of the sheet cannot be achieved. However, when there is less need for elongation of the sheet, the functional group value may be outside of the above range insofar as the flexibility of the sheet is sufficient.

These acryl resin materials can also be used as block copolymers wherein reactive moieties of the acryl resin are blocked or comb-shaped. In this case, the material used for blocking these reactive acryl resin materials include any combinations of materials including not only acryl, styrene, maleic acid or imide type materials highly compatible with the acryl resin, but also silicone or fluorine type materials capable of blocking. In this case, use can be made of a method of using these materials so as to attain a weight average molecular weight in the range defined above or a method of blending these block polymers with the reactive acryl resin.

(b) Low-molecular compound having a double bond in the molecule, contained in the gloss-controlling layer, includes e.g. monofunctional acrylates such as methyl (meth)acrylate, ethyl (meth)acrylate, benzyl (meth)acrylate, 2-ethoxyethyl (meth)acrylate and phenoxy diethylene glycol (meth)acrylate, and multifunctional acrylates such as 1,6-hexanediol di(meth)acrylate, neopentyl glycol di(meth) acrylate, polyethylene glycol di(meth)acrylate, polypropylene glycol di(meth)acrylate, trimethyl propane tri(meth) acrylate, pentaerythritol tri(meth)acrylate, pentaerythritol tetra(meth)acrylate and dipentaerythritol hexa(meth) acrylate.

Further, (b) low-molecular compound includes oligomers such as polyester acrylate, polyurethane acrylate, epoxy acrylate, polyether acrylate, oligoacrylate, alkyd acrylate, polyol acrylate etc. These low-molecular compounds may have functional groups such as hydroxyl group, amino group and carboxyl group.

The isocyanate type crosslinking agent is an isocyanate compound having two or more isocyanate groups in the molecule, and examples thereof include monomers such as tolylene diisocyanate, diphenylmethane diisocyanate, naphthalene diisocyanate, trizine diisocyanate, triphenylmethane triisocyanate, tris(isocyanatephenyl)thiophosphite, p-phenylene diisocyanate, xylylene diisocyanate, bis (isocyanatemethyl)cyclohexane, dicyclohexylmethane diisocyanate, hexamethylene diisocyanate, lysine diisocyanate, hexamethylene diisocyanate and isophorone diisocyanate, or trimethylol propane adducts of these monomers, or isocyanurate-, burette-, carbodiimide-, urethane- or allophanate-modified derivatives thereof.

The melamine type crosslinking agent refers to an etherified melamine resin produced by reacting, with an alcohol such as butyl alcohol or propyl alcohol, trimethylol melamine, hexamethylol melamine, dimethylol urea dimethylol guanidine, dimethylol acetoguanamine or dimethylol benzoguanamine obtained by reacting formaldehyde with a multifunctional material having an amino group, such as melamine, urea, thiourea, guanidine, guanamine, acetoguanamine, benzoguanamine, dicyan diamide or guanamine.

The epoxy type crosslinking agent is a glycidyl compound of polyvalent alcohol containing a plurality of epoxy groups, and is used together with a Lewis acid catalyst. The Lewis acid is formed preferably into microcapsules in order to retard the reaction. Examples thereof include glycidyl compounds such as diglycidyl ester of butadiene dioxide, hexadiyne dioxide or phthalic acid, diglycidyl ether of bisphenol A, diglycidyl ether of bisphenol F, triglycidyl ether amine of p-aminophenol, diglycidyl ether of aniline, tetraglycidyl ether of phenylene diamine, diglycidyl ether of sulfonamide, and triglycidyl ether of glycerin, and polyether-modified diglycidyl, polyester-modified diglycidyl or urethane-modified diglycidyl compounds (polymers), and vinylcyclohexene dioxide, dicyclopentadiene dioxide etc.

The crosslinking agent is added preferably in such an amount that the functional group value of the acryl resin: functional group value of the crosslinking agent is about 1: 0.7 to 1.3. However, the amount of the crosslinking agent is determined preferably by a preliminary experiment because the reaction of functional groups of the acryl resin or the crosslinking agents, for example, the reaction among the melamine type crosslinking agents, the reaction of the melamine type crosslinking agent with the epoxy crosslinking agent, etc. can actually occur depending on the reactivity of the crosslinking agent with the acryl resin used.

The fillers constituting the gloss-controlling layer are not limited; specifically, when composed of organic resin particles, the fillers include homopolymers or copolymers obtained by polymerizing one or more monomers selected from styrene or styrene derivatives such as vinyl styrene and chlorostyrene; monoolefins such as ethylene, propylene, butylene and isobutylene; vinyl esters such as vinyl acetate, vinyl propionate, vinyl benzoate and vinyl butyrate; α-unsaturated fatty monocarboxylates such as methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers such as vinyl methyl ether, vinyl ethyl ether and vinyl butyl ether; vinyl ketones such as vinyl methyl ketone, vinyl hexyl ketone and vinyl isopropenyl ketone; and diene type monomers such as isoprene and 2-chlorobutadiene.

Among these monomers, particularly styrene or derivatives thereof and α-unsaturated fatty monocarboxylates are preferably used, and when their hot-melt resin is to be used as fillers, the resin can be used as fillers constituting the gloss-controlling layer by coating the resin in a solvent in which it is not dissolved, and more preferably, a heat-curable resin having a crosslinked structure produced by adding a crosslinking agent etc. to such hot-melt resin or the above-described heat-curable resin, photo-curable resin or electron radiation curing resin is used in a pulverized form.

When the fillers constituting the gloss-controlling layer are composed of fine inorganic particles, examples of the fillers include mica, talc, silica, calcium carbonate, zinc white, halloysite clay, kaolin, basic magnesium carbonate, quartz powder, titanium dioxide, barium sulfate, calcium sulfate, alumina etc.

The fillers are generally in a spherical form, but may be in a plate, needle or indefinite form.

The difference in refractive index between the fillers and the resin is preferably 0.01 or more, more preferably 0.1 or more, to regulate surface gloss.

The weight average particle diameter of the fillers is preferably 10 μm or less, more preferably smaller than the thickness of the gloss-controlling layer, particularly preferably 0.01 to 5 μm.

The proportion by weight of the fillers and the resin (fillers:resin) in the gloss-controlling layer is preferably in the range of from 0.3:1 to 3:1, more preferably in the range of from 0.5:1 to 2:1. When the proportion of the fillers is in the range defined above, the gloss is hardly varied before and after image formation, but when the proportion of the fillers is lower than the range, the light scattering of the layer is lowered, while when the proportion is higher than the range, formation of the gloss-controlling layer is made difficult.

The release agent, charge controlling agent and matting agent which can be added to the image-receiving layer may also be added to the gloss-controlling layer to achieve similar effects to those described above. However, the matting agent is added to the gloss-controlling layer preferably in an amount of 0.1 to 10% by weight, more preferably 0.5 to 5% by weight, from the relationship thereof with the fillers. The volume average particle diameter of the matting agent added to the gloss-controlling layer is preferably in the range of 0.1 to 10 μm, particularly preferably in the range of 1 to 5 μm.

The image-receiving layer and the gloss-controlling layer can incorporate various plastic additives such as a heat stabilizer, an oxidation stabilizer, a light stabilizer, a lubricant, a pigment, a plasticizer, a crosslinking agent, an impact resistance improver, a flame-retardant, a flame-retardant assist and a charge controlling agent. These additives can also be added if necessary to a light resistance-controlling layer, a heat resistance-controlling layer and a flame retardancy-controlling layer described later.

The gloss-controlling layer composed at least of the resin and fillers can be formed by the method of forming the image-receiving layer as described above.

Regulation of Light Resistance

Regulation of light resistance is conducted such that a light entering from the controlling surface to exert an influence on the image is shielded by the controlling surface of the substrate 10 thereby further improving the light resistance of the image. The function controlling means 30 for controlling light resistance is composed of a heat resistance-controlling layer disposed on the controlling surface of the substrate, for example as shown in FIG. 1. The light resistance-controlling layer may be composed of light resistance-conferring agents such as a UV absorber, an antioxidant, and a pigment or dye having an absorption wavelength in the visible light range, and a resin for forming a coating of these light resistance-conferring agents, and these light resistance-conferring agents maybe formed directly as a coating on the substrate.

As the light resistance-conferring agent, the UV absorber may be the same as in the sublayer-protecting material described above.

As the light resistance-conferring agent, the antioxidant includes, for example, phosphate type antioxidants, sulfur type antioxidants, phenol type antioxidants, hindered amine antioxidants etc. Examples of the phosphate type antioxidants include phosphite compounds such as trimethyl phosphite, triethyl phosphite, tri-n-butyl phosphite, trioctyl phosphite, tridecyl phosphite, tristearyl phosphite, trioleyl phosphite, tristridecyl phosphite, tricetyl phosphite, dilaurylhydrodiene phosphite, diphenylmonodecyl phosphite, diphenylmono(tridecyl)phosphite, tetraphenyldipropyleneglycol diphosphite, 4,4'-butylidene-bis[3-methyl-6-t-(butyl) phenyl-di-tridecyl] phosphite, distearylpentaerythritol diphosphite, ditridecylpentaerythritol diphosphite, bis-nonylphenylpentaerythritol diphosphite, diphenyloctyl phosphite, tetra(tridecyl)-4,4'-isopropylidenediphenyl diphosphite, tris(2,4-di-t-butylphenyl)phosphite and di(2,4-di-t-butylphenyl)pentaerythritol diphosphite.

As the phosphate type antioxidants, any known trivalent organic phosphorus compounds can be used, and for example those described in JP-B 51-40589, JP-B 51-25064, JP-B 50-35097, JP-B 49-20928, JP-B 48-22330 and JP-B 51-35193 can also be used.

The sulfur type antioxidants include, for example, compounds such as di-n-dodecyl 3,3'-thiodipropionate, di-myristyl 3,3'-thiodipropionate, di-n-octadecyl 3,3'-thiodipropionate, 2-mercaptobenzoimidazole, pentaerythritol-tetrakis-(β-lauryl, urylthiopropionate), ditridecyl-3,3'-thiodipropionate, dimethyl 3,3'-thiodipropionate, octadecyl thioglycolate, phenothiazine, β,β'-thiodipropionic acid, n-butyl thioglycolate, ethyl thioglycolate, 2-ethylhexyl thioglycolate, isooctyl thioglycolate, n-octyl thioglycolate, di-t-dodecyl-disulfide, n-butyl sulfide, di-n-amyl disulfide, n-dodecyl sulfide, n-octadecyl sulfide, p-thiocresol, etc.

The phenol type antioxidants include, for example, compounds such as 2,6-di-t-butyl-p-cresol (BHT), 2,6-di-t-butylphenol, 2,4-di-methyl-6-t-butylphenol, butylhydroxyphenol, 2,2'-methylenebis(4-methyl-6-t-butylphenol), 4,4'-thiobis(3-methyl-6-t-butylphenol), bisphenol A, DL-α-tocopherol, styrenated phenol, styrenated cresol, 3,5-di-t-butylhydroxy benzaldehyde, 2,6-di-t-butyl-4-hydroxymethylphenol, 2,6-di-s-butylphenol, 2,4-di-t-butylphenol, 3,5-di-t-butylphenol, o-n-butoxyphenol, o-t-butylphenol, m-t-butylphenol, p-t-butylphenol, o-isobutoxyphenol, o-n-propoxyphenol, o-cresol, 4,6-di-t-butyl-3-methylphenol, 2,6-dimethylphenol, 2,3,5,6-tetramethylphenol, stearyl 3-(3',5'-di-t-butyl-4'-hydroxyphenyl) propionate, 2,4,6-tri-t-butylphenol, 2,4,6-trimethylphenol, 2,4,6-tris(3',5'-di-t-butyl-4'-hydroxybenzyl) mesitylene, 1,6-hexanediol-bis[3-(3,5-di-t-butyl-4-hydroxyphenyl) propionate], 2,2-thio-diethylenebis [3-(3,5-di-t-butyl-4-hydroxyphenyl) propionate], 2,2-thiobis (4-methyl-6-t-butylphenol), 3,5-di-t-butyl-4-hydroxybenzyl phosphate, o-n-propoxyphenol, o-cresol, 4,6-di-t-butyl-3-methylphenol, 2,6-dimethylphenol, 2,3,5,6-tetramethylphenol, stearyl 3-(3',5'-di-t-butyl-4'-hydroxyphenyl) propionate, 2,4,6-tri-t-butylphenol, 2,4,6-trimethylphenol, 2,4,6-tris(3',5'-di-t-butyl-4'-hydroxybenzyl) mesitylene, 1,6-hexanediol-bis[3-(3,5-di-t-butyl-4-hydroxyphenyl) propionate], 2,2-thio-diethylenebis [3-(3,5-di-t-butyl-4-hydroxyphenyl) propionate], 2,2-thiobis (4-methyl-6-t-butylphenol), diethyl 3,5-di-t-butyl-4-hydroxy-benzylphosphate, 1,3,5-trimethyl-2,4,6-tris(3,5-di-t-butyl-4-hydroxylbenzyl benzene, n-octadecyl-3-(3',5-di-t-butyl-4-hydroxyphenyl) propionate, 2-t-butyl-6 (3'-t-butyl-5'-methyl-2-hydroxybenzyl)-4-methylphenyl acrylate, 4,4'-butylidene-bis(3-methyl-6-t-butylphenol), hydroquinone, 2,5-di-t-butyl hydroquinone, tetramethyl hydroquinone etc.

The hindered amine type antioxidants include, for example, compounds such as bis(2,2,6,6-tetramethyl-4-piperidyl) sebacate, bis(1,2,2,6,6-pentamethyl-4-piperidyl) sebacate, 1-{2-[3-(3,5-di-t-butyl-4-hydroxyphenyl) propionyloxy]ethyl}-4-(3,5-di-t-butyl-4-hydroxyphenyl) propionyloxy-2,2,6,6-tetramethyl pyridine, 8-benzyl-7,7,9,9-tetramethyl-3-octyl-1,3,8-triazaspiro[4,5] undecane-2,4-dione, benzoyloxy-2,2,6,6-tetramethyl piperidine, 2,2,6,6-tetramethyl-4-piperidinol, tetrakis(2,2,6,6-tet-tetramethyl-4-piperidyl/decyl)-1,2,3,4-butane tetracarboxylate, etc.

These antioxidants may be used alone or as a mixture of two or more thereof.

As the light resistance-conferring agent, the pigment or dye having an absorption wavelength in the visible light range may be the same as added to the gloss-controlling layer described above.

Regulation of Chargeability

Regulation of chargeability is conducted such that the controlling surface is made a semi-electroconductive region by charging, to further improve the transferability of the image to the recording material. The function controlling means 30 for controlling heat resistance is composed of a charging-controlling layer disposed on the controlling surface of the substrate, for example as shown in FIG. 1. The heat resistance-controlling layer may be composed of the above-described charge controlling agents such as a surfactant, an electroconductive inorganic oxide or a polymeric electroconductive agent and a resin for forming a coating of these charge controlling agents, and these charge controlling agents may be applied directly onto the substrate or formed as a surface layer.

These charge controlling agents may be used alone or as a mixture of two or more thereof.

Regulation of Microbial Resistance

Regulation of microbial resistance is conducted such that propagation of fungi and microorganisms adhering to the controlling surface is prevented or a part of such bacteria are killed to decrease the number thereof. The function controlling means 30 for controlling microbial resistance is composed of a microbial resistance-controlling layer disposed on the controlling surface of the substrate, for example as shown in FIG. 1. The microbial resistance-controlling layer may be composed of antimicrobial agents such as a preservative, an anti-fungus agent, an anti-alga agent, a germicide and disinfectant, and a resin for forming a coating of these antimicrobial agents, and these antimicrobial agents may be applied directly onto the substrate or formed as a surface layer.

The antimicrobial agent is classified roughly into organic and inorganic antimicrobial agents. The organic antimicrobial agents include quaternary ammonium salt compounds such as benzalconium chloride and benzotonium chloride, glycine type compounds such as Tego-51, biguanide type compounds such as chlorhexidine (Hibiten), phenol type compounds such as Irgasan DP-300 (Trichlosan), isothiazolinenone type compounds such as 5-chloro-2-methyl-4-isothiazolin-3-one, 2-n-octyl-4-isothiazolin-3-one and 1,2-benzisothiazolin-3-one, aldehyde type compounds such as α-bromocinnamaldehyde (BCA), organic arsenic oxybis (phenoxy arsine), pyridine type compounds such as tetrachloro(methylsulfonyl) pyridine, Japanese horseradish-derived antimicrobial components such as allyl isothiocyanate, etc. In addition, the organic antimicrobial agents include nitrile derivatives, imidazole derivatives, triazine derivatives, pyrrole derivatives etc. However, these organic antimicrobial agents are poor in heat resistance, easily gasified, and easily dissolved in water and sweat, so that they are not only poor in durability of antibacterial properties but also easily exert an influence on the skin and the respiratory system, and therefore the inorganic antimicrobial agents shown below are desirable.

The majority of inorganic antimicrobial agents comprise a metal such as silver, copper or zinc carried on inorganic porous materials. The inorganic porous materials include, for example, zeolite type material based on zeolite, silica gel type material based on silica gel, glass type material based on glass, phosphate type material such as hydroxyapatite, zirconium phosphate type material based on zirconium phosphate, silicate type material such as calcium silicate, and titanium oxide type material based on titanium oxide, and other materials such as ceramics, whiskers etc.

These antimicrobial agents may be used alone or as a mixture of two or more thereof.

Regulation of Heat Resistance

Regulation of heat resistance is conducted such that heat applied to the controlling surface is shielded to further improve the heat resistance of the image. The function controlling means 30 for controlling heat resistance is composed of a heat resistance-controlling layer disposed on the controlling surface of the substrate, for example as shown in FIG. 1. The heat resistance-controlling layer may be composed of a heat-resistant resin and a heat-resistant material.

The heat-resistant resin includes those known as engineering resin, such as polyamide imide resin, polyimide resin, polyphenylene sulfide resin, polyether ether ketone resin, polyether sulfone resin, polyether imide resin, aromatic polyester resin, silicone resin, fluorine resin, thermotropic liquid crystal polymer, or copolymers thereof.

As the heat-resistant resin, the resin constituting the gloss-controlling layer, that is, hardening resin such as heat-curable resin, photo-curable resin, and electron radiation curing resin is used.

The heat resistance-controlling layer may be made of the heat-resistant resin only, or the heat-resistant resin and heat-resistant material may be used in combination. As the heat-resistant material, for example fillers constituting the gloss-controlling layer can be used.

When the heat-resistant material is not used in combination, the heat-resistant resin can be used in combination with thermoplastic resin etc. The thermoplastic resin may be for example the hot-melt resin constituting the gloss-controlling layer.

Regulation of Flame Retardancy

Regulation of flame retardancy is conducted so as to achieve resistance against flames over the controlling surface. The function controlling means 30 for controlling flame retardancy is composed of a flame retardancy- or heat resistance-controlling layer disposed on the controlling surface of the substrate, for example as shown in FIG. 1. The heat resistance-controlling layer may be composed of a flame-retardant resin and/or a resin.

As the flame-retardant material, addition-type flame-retardants such as halogen type flame-retardant, phosphate type flame-retardant and inorganic flame-retardant can be used.

The halogen type flame-retardant includes bromine type flame-retardants such as tetrabromobisphenol A (TBA), hexabromobenzene, decabromodiphenyl ether, tetrabromoethane (TBE), tetrabromobutane (TBB) and hexabromocyclodecane (HBCD) and chlorine type flame-retardants such as chlorinated paraffin, chlorinated polyphenyl, diphenyl chloride, perchloropentacyclodecane and chlorinated naphthalene, and these can be used in combination with antimony trioxide, to achieve a higher effect.

Typical examples of the phosphorus type flame-retardant include tricresyl phosphate, tri(β-chloroethyl) phosphate, tri(dichloropropyl) phosphate, tri(dibromopropyl) phosphate, 2,3-dibromopropyl-2,3-chloropropyl phosphate, etc.

The inorganic flame-retardant includes aluminum hydroxide, magnesium hydroxide phosphate or halogenated phosphates, hydrates of zirconium hydroxide, basic magnesium carbonate, dolomite, hydrotalcite, calcium hydroxide, barium hydroxide and tin oxide, hydrates of inorganic metal compounds such as borax, zinc borate, zinc metaborate, barium metaborate, zinc carbonate, calcium magnesium carbonate, calcium carbonate, barium carbonate, magnesium oxide, molybdenum oxide, zirconium oxide, tin oxide and red phosphorus, among which a hydrate of at least one metal compound selected from the group consisting of aluminum hydroxide, magnesium hydroxide, zirconium hydroxide, basic magnesium carbonate, dolomite and hydrotalcite, particularly aluminum hydroxide and magnesium hydroxide, is economically useful owing to its high flame-retardant effect.

The preferable particle diameter of the inorganic flame-retardant is varied depending on the type; for example, the average particle diameter of aluminum hydroxide or magnesium hydroxide is 20 μm or less, preferably 10 μm or less.

These flame-retardants may be used alone or as a mixture of two or more thereof.

When the halogen type flame-retardant or phosphorus type flame-retardant is selected as the flame-retardant material, the total amount of the flame-retardant incorporated is in the range of 5 to 50 parts by weight, more preferably in the range of 6 to 40 parts by weight, relative to 100 parts by weight of the resin. An amount outside of these ranges is problematic because if the amount of the flame-retardants is less than 5 parts by weight, high flame retardancy is hardly achieved, while an amount higher than 50 parts by weight does not improve flame retardancy so much and is thus uneconomical.

On the other hand, when the inorganic flame-retardant is selected as the flame-retardant material, the inorganic flame-retardant is incorporated preferably in the range of 30 to 200 parts by weight, more preferably in the rang of 40 to 150 parts by weight, based on 100 parts by weight of the resin. When the amount of the inorganic flame-retardant is less than 30 parts by weight, the inorganic flame-retardant cannot achieve sufficient flame retardancy by itself, thus requiring simultaneous use of the organic flame-retardant. On the other hand, when the inorganic flame-retardant is compounded in an amount of higher than 200 parts by weight, the resultant resin is inferior in abrasion resistance, has reduced mechanical strength such as impact strength, and is free of flexibility and inferior in low-temperature characteristics.

The inorganic flame-retardant is particularly useful as the flame-retardant material because of its advantage of not generating toxic gas such as halogen gas upon combustion.

As the resin constituting the flame retardancy-controlling layer, the hardening resin such as heat-curable resin, photo-curable resin and electron radiation curing resin, constituting the gloss-controlling layer described above, can be used.

In the invention, the function controlling means 30 may be conferred with a single function or if necessary with a number of functions. For conferring it with a number of functions, the functional controlling layers each having a single function may be layered on the controlling surface, or additives having other functions may be added to one functional controlling layer to confer two or more functions thereon.

Hereinafter, the method wherein an image is formed by the electrophotographic system on unprinted substrate P having the function controlling means and the image-receiving layer formed by the above method is described. In the following description, the function controlling means is constituted of the gloss-controlling layer, but the invention is not limited thereto.

Formation of an image on the unprinted substrate P by the electromagnetic system involves uniformly charging the surface of an electrophotographic photosensitive material and then exposing the surface to light based on information on an image, to form an electrophotographic latent image corresponding to the exposure. Then, a toner is fed from a developing device to the electrophotographic latent image on the surface of the photosensitive material, whereby the electrophotographic latent image is visualized and developed (toner image is formed). Further, the formed toner image is transferred to the surface of the unprinted substrate P where the image-receiving layer is formed, and finally the toner is fixed on the recording material by heating or pressurization, to form the image-recording material having the image formed thereon. In this process, the image recording material of the invention forms a reverse image on the surface of the unprinted substrate P where the image-receiving layer is formed, so that as the image information, the information on the reverse image is provided.

By heating and pressurization at the time of fixing, the toner is fixed on the unprinted substrate P, and simultaneously the toner is contacted with the fixing member, and thus when the toner is low-viscous or has highly affinity for the material of the fixing member, a part of the toner is transferred to the fixing member and remains on the fixing member to cause offset and deteriorate the fixing member, resulting in a reduction in the longevity of the fixing device. Accordingly, the image recording material should attain sufficient fixation of the toner image and releasability from the fixing member.

On the other hand, the non-image portion of the image recording material is contacted with the fixing member, thus requiring the same performance as that of the toner.

In the invention, therefore, the image-recording layer containing the specified polyester resin is formed on one side of the substrate, and further the gloss-controlling layer containing a resin such as hot-melt resin, heat-curable resin, photo-curable resin or electron radiation curing resin and fillers is formed on the other side of the substrate than where the image is formed, and preferably additives such as a release agent etc. are contained in both the layers thereby preventing adhesion to the fixing member in the fixing step. Further, the charge controlling agent can be added to the image-receiving layer to maintain transferability in the electrophotographic system.

According to the invention, an image-receiving image containing the specified polyester resin is disposed on one side of the substrate, while a gloss-controlling layer composed at least of a resin and fillers is formed on the other side, and a reverse image (mirror image) is formed on the image-receiving layer, whereby an image recording material having desired surface gloss can be obtained. When a function other than gloss is conferred as the function controlling means, an image recording material having surface (controlling surface) physical properties corresponding to the functions can be obtained.

The image recording material of the invention is excellent in image qualities (color, gloss, shielding properties) necessary for printed materials of sophisticated design and in stability in repetition of the image-forming process, forms an image recording material free of image defects caused by flaws and foreign matter, and can provide an image recording material securing sufficient heat resistance and light resistance even in outdoor use, which does not cause offset even with an oil-less toner.

The image-recording material of the invention can confer and/or improve various functions including not only gloss but also heat resistance, microbial resistance, light resistance, flame retardancy, humidity resistance, water repellency, abrasion resistance and mar resistance on the other side of the substrate than where an image is formed. The image-recording material wherein functions are conferred and/or improved is for example a building material (decorative laminated sheet, wall plate and wall paper) comprising the image-recording material with a reverse image formed on the back thereof and a silicone hard coating layer with a gloss-controlling ability, heat resistance, water repellency, abrasion resistance etc. formed on the surface thereof, or a plate material comprising the image-recording material bonded via an adhesive to the surface of wood etc. to form an image pattern on the surface thereof. Further, the image-recording material having the gloss-controlling layer formed thereon can be utilized preferably as illuminating film. Accordingly, the image-recording material of the invention can have functions capable of dealing with various applications.

Like the image recording material, an image display material capable of using the image-recording material of the invention as e.g. a surface protective film can exhibit the above-described excellent effects.

EXAMPLES

Hereinafter, the present invention is described in more detail by reference to the Examples, which however are not intended to limit the invention. In the Examples and Comparative Examples, the term “parts” refers to parts by weight.

Example 1

The image-recording material of the invention (Example 1) is produced. Hereinafter, the respective steps of the process are described.

Preparation of a Gloss-Controlling Coating Solution 10 parts of a polyester resin (trade name: F-1, a solid contents of 30% by weight, manufactured by Soken Chemical & Engineering Co., Ltd.) as the hot-melt resin, 6 parts of fine crosslinked polymethyl methacrylate particles (trade name: MP-300F, a volume average particle diameter of 0.1 μm, manufactured by Soken Chemical & Engineering Co., Ltd.) as fillers, 0.3 part of 2,4-dihydroxybenzophenone (trade name: SEESORB 100, manufactured by Shipuro Kasei Co., Ltd.) as UV absorber and 0.2 part of a charge controlling agent (Elegan 264WAX, manufactured by Nippon Oil & Fats Co., Ltd.) are added to 30 parts of cyclohexanone, and the mixture is stirred sufficiently to prepare a gloss-controlling coating solution A.

Preparation of an Image-Receiving Coating Solution

Terephthalic acid and isophthalic acid as polyvalent carboxylic acid components, and ethylene glycol and neopentyl glycol as polyvalent hydroxy compounds, are used to synthesize the specified polyester resin (number average molecular weight 12,000, glass transition point 62° C.) wherein n/m in the structural formula (I) above is 1.

0.05 part of fine crosslinked polymethyl methacrylate particles (trade name: MP-150, a volume average particle diameter of 5 μm, manufactured by Soken Chemical & Engineering Co., Ltd.)is added as the matting agent to 10 parts of a resin solution containing 30% by weight of the synthesized, specified polyester resin in methyl ethyl ketone, and 0.2 part of a charge controlling agent (trade name: Elegan 264WAX, manufactured by Nippon Oil & Fats Co., Ltd.), 25 parts of methyl ethyl ketone and 5 parts of cyclohexanone are added to the mixture to form an image-receiving image coating solution B.

Production of an Image Recording Material

The gloss-controlling coating solution A is applied onto one side of 150 μm PET film (trade name: Lumirror 150T60, manufactured by Toray Industries, Inc.) and dried at 130° C. for 2 minutes, to form a gloss-controlling layer of 2 μm in thickness. The image-receiving coating solution B is applied onto the other side than where the gloss-controlling layer is formed, to form an image-receiving layer of 2 μm in thickness, thus producing an image recording material (with no image formed thereon) having a gloss-controlling layer formed on one side.

Evaluation of the Image Recording Material

By a color copying machine (trade name: DocuCentre Color 500 (using an oil-less toner) manufactured by Fuji Xerox Co., Ltd.), a color reverse image containing a solid image is formed on the surface of the image-recording layer of the produced image recording material (with no image formed thereon), to give the image recording material having an image formed thereon. The image recording material is examined for the travel of the image recording material, the fixation of the image, the density of the image after printing, and the surface gloss at the side of the gloss-controlling layer. Further, the heat resistance and light resistance of the formed image are evaluated, and the performance of the image-recording material is thus confirmed.

Evaluation of the Travel of the Image Recording Material

The travel of the produced image recording material (with no image formed thereon) is examined by measuring generated jams or the number of sheets undergoing offset when 100 sheets are traveled with the electrophotographic device. ⊚ is given when no sheet underwent offset; ○, 1 sheet; Δ, 2 sheets; and X, 3 or more sheets.

Evaluation of the Fixation of the Image

The fixation of the image onto the image recording material is evaluated as follows: A commercial cellophane adhesive tape of 18 mm in width (trade name: Cellophane tape, manufactured by Nichiban Co., Ltd.) is attached at a linear pressure of 300 g/cm onto the solid image with a density of about 1.8 fixed by the electrophotographic device, and the cellophane tape is removed at a rate of 10 m/sec. The fixation of the image is evaluated in terms of the ratio of the density of the image after removal of the cellophane tape to the density of the image before removal of the tape (referred to hereinafter as OD ratio) (OD ratio=density of the image after removal/density of the image before removal). The electromagnetic recording medium is generally required to have toner fixation of 0.8 or more in terms of OD ratio.

Surface Gloss at the Side of the Gloss-Controlling Layer

As the surface gloss at the side of the gloss-controlling layer of the image-recording material, the specular gloss at 75° of the controlling layer is evaluated by measuring the solid image at the side of the controlling surface with a digital gloss meter. In this evaluation, ○ is given when the gloss is less than 20; Δ, when the gloss is 20 to 40; and X, when the gloss is higher than 40.

Evaluation of the Heat Resistance of the Image

The image recording material is placed such that the surface having the solid image formed thereon is directed upward and then left for 100 hours in a drying oven at 90° C. Before and after the image recording material is left in the drying oven, the density of the image is measured with the densitometer. In this evaluation, ○ is given when the difference in the density of the image is less than 0.1; Δ, 0.1 to 0.3; and X, when the image is higher than 0.3.

Evaluation of Light Resistance

The image recording material is disposed in a light resistance testing machine (trade name: SUNTEST CPS+, manufactured by Toyo Seiki Seisaku-sho, Ltd.) such that the surface having the solid image formed thereon is directed downward, and the image is irradiated with a light at an intensity of 760 $W/m^2$ from a Xe lamp for 100 hours in an atmosphere at 63° C. The density of the image before and after the light resistance test is measured, and ◎ is given when the difference in the density of the image is less than 0.1; ○, 0.1 to 0.2; Δ, 0.2 to 0.3; and X, higher than 0.3.

These results are shown collectively in Table 1.

Example 2

The image-recording material (Example 2) of the invention is produced. Hereinafter, the respective steps of the process are described.

Preparation of a Gloss-Controlling Coating Solution 10 parts of a polyester resin (trade name: F-1, solids content of 30% by weight, manufactured by Soken Chemical & Engineering Co., Ltd.) as the hot-melt resin, 9 parts of fine melamine-formaldehyde condensate particles (trade name: Eposter S, volume average particle diameter of 0.3 μm, manufactured by Nippon Shokubai Co., Ltd.) as fillers, 0.5 part of 2,2',4,4'-tetrahydroxybenzophenone (SEESORB106, manufactured by Shipro Kasei Kaisha Ltd.) as UV absorber and 0.2 part of a charge controlling agent (Elegan 264WAX, manufactured by Nippon Oil & Fats Co., Ltd.) are added to 30 parts of cyclohexanone, and the mixture is stirred sufficiently to prepare a gloss-controlling coating solution C.

Preparation of an Image-Receiving Coating Solution

An image-receiving coating solution D is prepared in the same manner as in Example 1 except that terephthalic acid and isophthalic acid as polyvalent carboxylic acid components, and ethylene glycol and neopentyl glycol as polyvalent hydroxy compounds, are used to synthesize the specified polyester resin (number average molecular weight 24,000, glass transition point 67° C.) wherein n/m in the structural formula (I) above is 1.5.

Preparation of an Image Recording Material

The gloss-controlling coating solution C is applied onto one side of a triacetate film of 125 μm in thickness (trade name: Fuji Tack FT125, Fuji Photo Film Co., Ltd.) and dried at 120° C. for 2 minutes, to form a gloss-controlling layer of 2 μm in thickness. The image-receiving coating solution D is applied onto the other side than where the gloss-controlling layer is formed, to form an image-receiving layer of 2 μm in thickness, thus producing an image recording material (with no image formed thereon) having a gloss-controlling layer formed on one side.

Evaluation of the Performance of the Image Recording Material

After a color reverse image is formed on the image-recording material (with no image formed thereon) in the same manner as in Example 1, the travel of the image recording material, the fixation of the image, the surface gloss at the side of the gloss-controlling layer, the heat resistance of the image, and light resistance are evaluated, and the results are shown collectively in Table 1.

Example 3

The image-recording material (Example 3) of the invention is produced. Hereinafter, the respective steps of the process are described.

Preparation of a Gloss-Controlling Coating Solution 10 parts of a silicone resin (trade name: SHC900, solids content of 30% by weight, manufactured by GE Toshiba Silicones Co., Ltd.) as heat-curable resin, 2.5 parts of fine polymethyl siloxane particles (trade name: TP105, volume average particle diameter of 0.5 μm, manufactured by GE Toshiba Silicones Co., Ltd.) as fillers, 0.3 part of 2-(2-hydroxy-5-methylphenyl)-2H-benzotriazole (trade name: Sumisorb 200, manufactured by Sumitomo Chemical Co., Ltd.) as UV absorber and 0.3 part of a charge controlling agent (trade name: Pionin B144V, manufactured by Takemoto Oil & Fat Co., Ltd.) are added to 30 parts of cyclohexanone/methyl ethyl ketone=5/95 (ratio by weight), and the mixture is stirred sufficiently to prepare a gloss-controlling coating solution E.

Preparation of an Image-Receiving Coating Solution

An image-receiving coating solution F is prepared under heating at 40° C. in the same manner as in Example 1 except that terephthalic acid and isophthalic acid as polyvalent carboxylic acid components, and ethylene glycol and neopentyl glycol as polyvalent hydroxy compounds, are used to synthesize the specified polyester resin (number average molecular weight 40,000, glass transition point 90° C.) wherein n/m in the structural formula (I) above is 9.

Preparation of an Image Recording Material

The gloss-controlling coating solution E is applied onto one side of a PET film of 125 μm in thickness (trade name: Lumirror 125S10, Toray Industries, Inc.) and dried at 130° C. for 2 minutes, to form a gloss-controlling layer of 3 μmin thickness. The image-receiving coating solution F is applied onto the other side than where the gloss-controlling layer is formed, to form an image-receiving layer of 1.3 μm in thickness, thus producing an image recording material (with no image formed thereon) having a gloss-controlling layer formed on one side.

Evaluation of the Performance of the Image Recording Material

After a color reverse image is formed on the image-recording material (with no image formed thereon) in the same manner as in Example 1, the travel of the image recording material, the fixation of the image, the surface gloss at the side of the gloss-controlling layer, the heat resistance of the image, and light resistance are evaluated, and the results are shown collectively in Table 1.

Example 4

Preparation of a Gloss-Controlling Coating Solution 10 parts of a silicone resin (trade name: SI Coat 801, solids content of 30% by weight, manufactured by GE Toshiba Silicones Co., Ltd.) as heat-curable resin, 5.5 parts of fine polymethyl siloxane particles (trade name: TP105, volume average particle diameter of 0.5 μm, manufactured by GE Toshiba Silicones Co., Ltd.) as fillers, 0.1 part of an antioxidant (trade name: Chelex-500, manufactured by Sakai Chemical Industry Co., Ltd.) and 0.2 part of a charge controlling agent (trade name: Pionin B144V, manufactured by Takemoto Oil & Fat Co., Ltd.) are added to 30 parts of cyclohexanone/methyl ethyl ketone=5/95 (ratio by weight), and the mixture is stirred sufficiently to prepare a gloss-controlling coating solution G.

Preparation of an Image-Receiving Coating Solution

An image-receiving coating solution H is prepared in the same manner as in Example 1 except that terephthalic acid and isophthalic acid as polyvalent carboxylic acid components, and ethylene glycol and neopentyl glycol as polyvalent hydroxy compounds, are used to synthesize the specified polyester resin (number average molecular weight 31,000, glass transition point 82° C.) wherein n/m in the structural formula (I) above is 3.

Preparation of an Image Recording Material

The gloss-controlling coating solution G is applied onto one side of a PET film of 100 μm in thickness (trade name: Lumirror 125S10, manufactured by Toray Industries, Inc.) and dried at 140° C. for 5 minutes, to form a gloss-controlling layer of 2.5 μm in thickness. The image-receiving coating solution H is applied onto the other side than where the gloss-controlling layer is formed, to form an image-receiving layer of 1.5 μm in thickness, thus producing an image recording material (with no image formed thereon) having a gloss-controlling layer formed on one side.

Evaluation of the Performance of the Image Recording Material

After a color reverse image is formed on the image-recording material (with no image formed thereon) in the same manner as in Example 1, the travel of the image recording material, the fixation of the image, the surface gloss at the side of the gloss-controlling layer, the heat resistance of the image, and light resistance are evaluated, and the results are shown collectively in Table 1.

Comparative Example 1

An image-receiving coating solution B' is prepared in the same manner as in Example 1 except for use of the specified polyester resin (trade name: Byron 200, number average molecular weight 17,500, glass transition point 67° C., manufactured by Toyobo Co., Ltd.) using terephthalic acid and isophthalic acid as polyvalent carboxylic acid components and ethylene glycol and neopentyl glycol as polyvalent hydroxy compounds wherein n/m in the structural formula (I) above is 0.8, and an image recording material (with no image formed thereon) is produced in the same manner as in Example 1. After a color reverse image is formed on the image-recording material (with no image formed thereon) in the same manner as in Example 1, the image recording material is evaluated, and the results are shown collectively in Table 1.

Comparative Example 2

An image-receiving coating solution B" is prepared in the same manner as in Example 1 except that terephthalic acid and isophthalic acid as polyvalent carboxylic acid components, and ethylene glycol and neopentyl glycol as polyvalent hydroxy compounds, are used to synthesize the specified polyester resin (number average molecular weight 8,500, glass transition point 60° C.) wherein n/m in the structural formula (I) above is 1, and an image recording material (with no image formed thereon) is produced in the same manner as in Example 1. After a color reverse image is formed on the image-recording material (with no image formed thereon) in the same manner as in Example 1, the image recording material is evaluated, and the results are shown collectively in Table 1.

Comparative Example 3

An image-receiving coating solution B'" is prepared in the same manner as in Example 1 except that terephthalic acid and isophthalic acid as polyvalent carboxylic acid components, and ethylene glycol and neopentyl glycol as polyvalent hydroxy compounds, are used to synthesize the specified polyester resin (number average molecular weight 46,000, glass transition point 99° C.) wherein n/m in the structural formula (I) above is 19, and an image recording material (with no image formed thereon) is produced in the same manner as in Example 1. After a color reverse image is formed on the image-recording material (with no image formed thereon) in the same manner as in Example 1, the image recording material is evaluated, and the results are shown collectively in Table 1.

TABLE 1

| | Travel | Fixation | Gloss | Heat resistance of image | Light resistance |
|---|---|---|---|---|---|
| Example 1 | ○ | 0.95 | ○ | ○ | ○ |
| Example 2 | ○ | 0.96 | ○ | ○ | ◎ |
| Example 3 | ○ | 0.84 | ○ | ○ | ○ |
| Example 4 | ○ | 0.9 | ○ | ○ | ○ |
| Comparative Example 1 | Δ | 0.65 | ○ | ○ | ○ |
| Comparative Example 2 | X | 0.98 | ○ | Δ | ○ |
| Comparative Example 3 | ○ | 0.77 | ○ | Δ | ○ |

According to Table 1, it can be seen that the image recording materials in Examples 1 to 4 achieve sufficient travel and fixation of the image as well as high heat resistance and light resistance of the image. On the other hand, the image recording materials in Comparative Examples 1 and 2 are inferior in travel and/or fixation of the image, revealing insufficient functions of the image-receiving layer.

Further, the gloss of the image-receiving materials in Examples 1 to 4 is recognized to limited to low levels, thus revealing high visibility of the formed image.

Example 5

The image-receiving coating solution D in Example 2 is applied in an amount of 30 g/$m^2$ onto both sides of a 75 μm PET film (trade name: Lumirror 75T60, Toray Industries, Inc.) and dried at 130° C. for 1 minute, to produce an image recording material (with no image formed thereon) having an image-receiving layer of 2 μm in thickness formed on each of the sides of the substrate.

Using the same method and device in Example 1, a mirror image of a landscape photograph composed of yellow, magenta, cyan, red, blue, green and black is formed on one of the image-receiving layers of the produced image-recording material (with no image formed thereon). Then, an A-PET transparent sheet (trade name: Diakrail A2102, thickness 0.5 mm, manufactured by Mitsubishi Plastics, Inc.) is layered as a protective layer on the surface of the image-forming surface of the image recording material and laminated at 160° C. at a rate of 0.3 m/min. With a laminator (LamipackerLPD3206 City, Fujipla Inc.), to produce an image display material.

Evaluation of the Image Display Material

Assuming that the image display material is used indoors by projection with backlighting, the image display material is examined for light resistance to UV rays (in the same manner as in Example 1) and for coloration of the projected image. In evaluation of coloration, the resultant color image is observed with eyes, and ○ is given when sufficient coloration is observed; Δ, when partial turbidity or reduction in transmittance is observed; and X, when coloration is poor as a whole.

As a result, both light resistance and coloration are ○. Because of its high coloration in this result, the image-receiving layer having the image formed thereon is revealed to exhibit the functions thereof. Because the image-receiving layer is superior in light resistance, the image-receiving layer on which the image is not formed, that is, the layer containing the specified polyester resin is also revealed to have excellent light resistance.

Example 6

Preparation of an Image-Receiving Coating Solution

Terephthalic acid and isophthalic acid as polyvalent carboxylic acid components and ethylene glycol and neopentyl glycol as polyvalent hydroxy compounds are used to synthesize the specified polyester resin (number average molecular weight 24,000, glass transition point 75° C.) wherein n/m in the structural formula (I) above is 1.5.

0.05 part of fine crosslinked polymethyl methacrylate particles (trade name: MX-500, volume average particle diameter 5 μm, manufactured by Soken Chemical & Engineering Co., Ltd.) as a matting agent and 0.5 part of 2-(2-hydroxy-5-methylphenyl)-2H-benzotriazole (trade name: Sumisorb 200, manufactured by Sumitomo Chemical Co., Ltd.) as UV absorber are added to 10 parts of a resin solution containing 30% by weight of the synthesized, specified polyester resin in methyl ethyl ketone, and 0.2 part of a charge controlling agent (trade name: Elegan 264WAX, manufactured by Nippon Oil & Fats Co., Ltd.), 25 parts of methyl ethyl ketone and 5 parts of cyclohexanone are added thereto and sufficiently stirred to prepare an image-receiving coating solution I.

The image-receiving coating solution I is applied in an amount of 45 g/$m^2$ onto both sides of a 50 μm PET film (trade name: Lumirror 50T60, manufactured by Toray Industries, Inc.) and dried at 130° C. for 1 minute, to produce an image recording material (with no image formed thereon) having an image-receiving layer of 3 μm in thickness formed on each of the sides of the substrate.

Using the same method and device in Example 1, an image containing a color photograph of a face is formed on one of the image-receiving layers of the produced image-recording material (with no image formed thereon). Then, an A-PET white sheet (trade name: Diakrail W2102, thickness 1 mm, manufactured by Mitsubishi Plastics Industries Ltd.) is layered on the surface of the image-forming surface and laminated at 160° C. at a rate of 0.3 m/min. with a laminator (Lamipacker LPD3206 City, Fujipla Co., Ltd.) in the same manner as in Example 5, to produce a poster containing the photograph of a face having a thickness of about 1 mm (image display material).

Evaluation of the Image Display Material

Assuming that this image display material is used outdoors as a signboard, the image display material is evaluated in the same manner as in Example 5 (except that coloration is evaluated using the reflected image but not the projected image) to evaluate deterioration thereof with rainwater and deterioration of the laminate. In evaluation of deterioration with rainwater, the image and the laminate before the test are compared with those after the test using a shower at 40 L/min. for 250 hours at 30° C. in a water resistance and rainwater resistance testing machine (trade name: MHS type, manufactured by Itabashi Rika Kogyo Co., Ltd.), and ○ is given when there is no change therebetween, while X is given when there is a change.

As a result, ○ is given to any items i.e. light resistance, coloration and deterioration with rainwater. Because of its high coloration in this result, the image-receiving layer having the image formed thereon is revealed to exhibit the functions thereof. Because the image-receiving layer is superior in light resistance, the image-receiving layer on which the image is not formed, that is, the layer containing the specified polyester resin is also revealed to have excellent light resistance. Further, the image-receiving layer is hardly deteriorated by rainwater and can thus be used satisfactorily as an outdoor signboard.

Comparative Example 4

A color image is formed directly on one side of a 500 μm transparent triacetate film (trade name: Fujitack FT125, manufactured by Fuji Photo Film Co., Ltd.) as the substrate in the same manner as in Example 1, to produce an image recording material. In this process, the image recording material partially undergo offset, and is poor in the ability to fix the image, thus permitting the image to be removed upon rubbing with nails. The image recording material is evaluated for image coloration in the same manner as in Example 5, indicating poor coloration i.e. X. Further, the image recording material is easily charged because of high surface resistance, thus making dust adhesion and toner scattering remarkable, to indicate poor image reproductivity.

Comparative Example 5

A color image is formed in the same manner as in Example 1 directly on one side of a 250 μm transparent PET sheet (trade name: Lumirror 250T-60, solids content 30% by weight, produced by Toray Industries, Inc.) as the substrate, to produce an image recording material. In this process, the image recording material partially undergo offset, and is poor in the ability to fix the image, thus permitting the image to be removed upon rubbing with nails. Further, the image recording material is evaluated for light resistance and water resistance in the same manner as in Examples 1 and 6, and as a result, the yellowing of the transparent PET sheet is significant in the evaluation of light resistance to UV rays, to deteriorate the appearance significantly. From the evaluation of water resistance, it is removed that the image is partially removed, and the remaining image is deteriorated so that it is removed upon rubbing with fingers. In the same image coloration evaluation as in Example 5, the coloration is poor i.e. X. Further, the image recording material is easily charged because of high surface resistance, thus making dust adhesion and toner scattering remarkable, to indicate poor image reproductivity.

Example 7

Preparation of a Light Resistance-Controlling Coating Solution 10 parts of a silicone resin (trade name: SHC900, solids content of 30% by weight, manufactured by GE Toshiba Silicones Co., Ltd.) as heat-curable resin, 2.5 parts of fine polymethyl siloxane particles (trade name: TP145, volume average particle diameter of 4.5 μm, manufactured by GE Toshiba Silicones Co., Ltd.) as fillers, 1 part of 2-(2-hydroxy-5-methylphenyl)-2H-benzotriazole (trade name: Sumisorb 200, manufactured by Sumitomo Chemical Co., Ltd.) as UV absorber and 0.5 part of a charge controlling agent (trade name: Pionin B144V, manufactured by Takemoto Oil & Fat Co., Ltd.) are added to 30 parts of cyclohexanone/methyl ethyl ketone=10/95 (ratio by weight), and the mixture is stirred sufficiently to prepare a light resistance-controlling coating solution.

Preparation of an Image-Recording Material

The light resistance-controlling coating solution is applied in an amount of 60 g/$m^2$ onto one side of a PET film of 250 μm in thickness (trade name: Lumirror 250S60, manufactured by Toray Industries, Inc.) and dried at 130° C. for 1 minute, to form a light resistance-controlling layer of 5 μm in thickness. The image-receiving coating solution I used in Example 6 is applied onto the other side, to produce an image recording material (with no image formed thereon).

Preparation and Evaluation of the Image Display Material

Using the same method and device in Example 1, a mirror image of a landscape photograph composed of yellow, magenta, cyan, red, blue, green and black is formed on the image-receiving layer of the produced image-recording material (with no image formed thereon). Then, a white PET sheet (trade name: Lumirror E-20, 0.25 mm, manufactured by Toray Industries, Inc.) is layered on the surface of the image-forming surface of the image recording material and laminated at 160° C. at a rate of 0.3 m/min. With a laminator (tradename: LamipackerLPD3206 City, manufactured by Fujipla Co., Ltd.), to produce an image display material.

The produced image display material is evaluated in the same manner as in Example 6, and as a result, good results are obtained in any items.

Example 8

Preparation of a Microbial Resistance-Controlling Coating Solution 10 parts of a silicone resin (trade name: SHC900, solids content of 30% by weight, manufactured by GE Toshiba Silicones Co., Ltd.) as heat-curable resin, 0.4 part of fine polymethyl siloxane particles (trade name: TP130, volume average particle diameter of 3 μm, manufactured by GE Toshiba Silicones Co., Ltd.) as fillers, 0.2 part of a charge controlling agent (trade name: Pionin B144V, manufactured by Takemoto Oil & Fat Co., Ltd.), 0.4 part of 2-(2-hydroxy-5-methylphenyl)-2H-benzotriazole (trade name: Sumisorb 200, manufactured by Sumitomo Chemical Co., Ltd.) and 0.03 part of a calcium phosphate type antimicrobial agent carrying silver (trade name: Apacider AK, manufactured by Sangi Co., Ltd.) as an antimicrobial agent are added to 30 parts of cyclohexanone/methyl ethyl ketone in the ratio of 25/75 by weight, and the mixture is stirred sufficiently to prepare a microbial resistance-controlling coating solution.

Preparation of an Image-Recording Material

The microbial resistance-controlling coating solution is applied in an amount of 20 $g/m^2$ onto one side of a transparent PET film of 250 μm in thickness (trade name: Lumirror 250S60, manufactured by Toray Industries, Inc.) and dried at 130° C. for 1 minute, to form a microbial resistance-controlling layer of 1 μm in thickness. Then, the image-receiving coating solution I used in Example 6 is applied onto the other side of the substrate, to produce an image recording material (with no image formed thereon).

Preparation and Evaluation of an Image Display Material

Using the produced image-recording material (with no image formed thereon), an image display material containing a photograph of a face (name plate) is prepared and evaluated in the same manner as in Example 6, and good results similar to those in Example 6 are obtained in any items.

In evaluation of the microbial resistance of the image display material, the material is evaluated for the presence of *E. coli* and Staphylococcus aureus by a film adhesion method according to "Kokinseihin Gijyutsu Kyokai" (Society of Industrial-Technology for Antimicrobial Articles). The results are shown in Table 2 below.

TABLE 2

| Microorganism | Test specimen | Number of initially added microorganisms | Number of viable microorganisms (after 24 hours) |
|---|---|---|---|
| *E. coli* | Example 8 | $4.5 \times 10^5$ | <10 |
| | Blank | | $4.5 \times 10^5$ |
| | Control group | | $2.5 \times 10^7$ |
| *Staphylococcus aureus* | Example 8 | $4.1 \times 10^5$ | <10 |
| | Blank | | $7.8 \times 10^6$ |
| | Control group | | $2.1 \times 10^5$ |

As can be seen from Table 2, the number of viable microorganisms after 24 hours is very low indicating that the effect of antimicrobial resistance is sufficiently demonstrated.

Example 9

Preparation of a Flame Retardancy-Controlling Image-Receiving Coating Solution

First, terephthalic acid and isophthalic acid as polyvalent carboxylic acid components and ethylene glycol and neopentyl glycol as polyvalent hydroxy compounds are used to synthesize the specified polyester resin (number average molecular weight 24,000, glass transition point 75° C.) wherein n/m in the structural formula (I) above is 1.5.

0.05 part of fine crosslinked polymethyl methacrylate particles (trade name: MX-500, volume average particle diameter 5 μm, manufactured by Soken Chemical & Engineering Co., Ltd.) is added as a matting agent to 10 parts of a resin solution containing 30% by weight of the synthesized, specified polyester resin in methyl ethyl ketone, and 0.2 part of a charge controlling agent (trade name: Elegan 264WAX, manufactured by Nippon Oil & Fats Co., Ltd.), 1.8 parts of perchloropentacyclodecane as a flame-retardant, 25 parts of methyl ethyl ketone and 5 parts of cyclohexanone are added thereto, and the mixture is sufficiently stirred to prepare a flame retardancy-controlling image-receiving coating solution.

The flame retardancy-controlling image-receiving coating solution is applied in an amount of 45 $g/m^2$ onto both sides of a 150 μm transparent PET film (trade name: Lumirror 150T60, manufactured by Toray Industries, Inc.) and dried at 130° C. for 1 minute, to produce an image recording material having an image-receiving layer of 3 μm in thickness formed on each of the sides of the substrate (with no image formed thereon).

Preparation and Evaluation of an Image Display Material

Using the produced image recording material (with no image formed thereon), an image display material (name plate) containing a photograph of a face is prepared and evaluated in the same manner as in Example 6, and as a result, good results similar to those in Example 6 are obtained in any items.

For evaluation of the flame retardancy of the image display material, the following burning test is carried out. In the burning test, the image display material in Example 9 having a width of 60 mm and a length of 150 mm is used as a sample, and this sample is attached to a U-shaped retainer, disposed horizontally and ignited at the controlling site. ○ is given when self-extinction occurrs within 10 seconds; Δ, when self-extinction occurrs within 20 seconds; and X, when self-extinction does not occur within 20 seconds. As a result, the image display material in Example 9 is extinguished by itself and judged to be ○.

According to the image recording material and image display material of the invention, an easily producible high-quality image having sufficient heat resistance, light resistance and flame retardancy even in outdoor use can be formed with good visibility. Further, according to the image recording material and image display material of the invention, a function controlling means is disposed on the other side of the substrate than where an image is formed, thus permitting the material to be usable in various environments and conferring sufficient microbial resistance in particular on the surface of the indicating material. Further, according to the image recording material and image display material of the invention, a material having releasability is contained in a gloss-controlling layer and an image-receiving layer constituting the image recording material so that even if an oil-less toner is used, a phenomenon of offset can be prevented.

What is claimed is:

1. An image recording material comprising: a transparent substrate; an image-receiving layer for forming an image by an electrophotographic system and disposed on one side of the substrate; and a function-controlling means disposed on the other side of the substrate;

wherein the image-receiving layer include a polyester resin which comprises a structural unit represented by the structural formula (I) and which has a number average molecular weight of 12,000 to 45,000:

wherein the image-receiving layer include a polyester resin which comprises a structural unit represented by the structural formula (I) and which has a number average molecular weight of 12,000 to 45,000:

Structural formula (I)

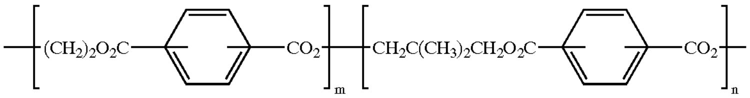

Structural formula (I)

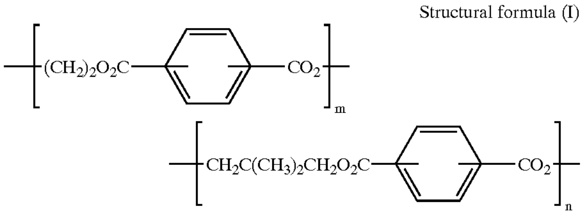

wherein n and m represent integers such that a molar ratio n/m is from 1 to 9.

2. An image recording material according to claim 1, wherein the image-receiving layer further comprises a charge controlling agent.

3. An image recording material according to claim 2, wherein the charge controlling agent is a surfactant.

4. An image recording material according to claim 1, wherein the function controlling means comprises a function-controlling layer for controlling at least one function selected from gloss, microbial resistance, flame retardancy, light resistance and chargeability.

5. An image recording material according to claim 4, wherein the function-controlling layer has a function of controlling gloss, and the function-controlling layer comprises a resin and a filler.

6. An image recording material according to claim 4, wherein the function-controlling layer has a function of controlling microbial resistance, and the function-controlling layer comprises an inorganic antimicrobial agent.

7. An image recording material according to claim 4, wherein the function-controlling layer has a function of controlling light resistance, and the function-controlling layer comprises at least one of an UV absorber and an antioxidant.

8. An image recording material according to claim 1, wherein a protective layer is disposed on the surface of the image-receiving layer.

9. A protective film comprising at least a transparent substrate, an image-receiving layer for forming an image by an electrophotographic system are disposed on one side of the substrate, and a function controlling means disposed on the other side of the substrate, wherein n and m represent integers such that a molar ratio n/m is from 1 to 9.

10. A protective film according to claim 9, wherein the image-receiving layer further comprises a charge controlling agent.

11. A protective film according to claim 9, wherein the charge controlling agent is a surfactant.

12. A protective film according to claim 9, wherein the function controlling means comprises a function-controlling layer for controlling at least one function selected from gloss, microbial resistance, flame retardancy, light resistance and chargeability.

13. A protective film according to claim 12, wherein the function-controlling layer has a function of controlling gloss, and the function-controlling layer comprises a resin and a filler.

14. A protective film according to claim 12, wherein the function-controlling layer has a function of controlling microbial resistance, and the function-controlling layer comprises an inorganic antimicrobial agent.

15. A protective film according to claim 12, wherein the function-controlling layer has a function of controlling light resistance, and the function-controlling layer comprises at least one of a UV absorber and an antioxidant.

16. A protective film according to claim 9, wherein a protective layer is disposed on the surface of the image-receiving layer.

17. An image display material comprising at least a transparent substrate, an image-receiving layer for forming an image by an electrophotographic system are disposed on one side of the substrate, and a function controlling means disposed on the other side of the substrate, wherein the image-receiving layer include a polyester resin which comprises a structural unit represented by the structural formula (I) and which has a number average molecular weight of 12,000 to 45,000:

Structural formula (I)

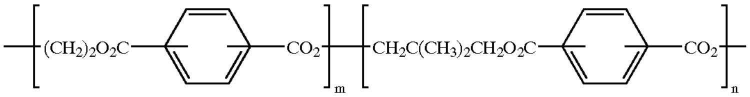

wherein n and m represent integers such that a molar ratio n/m is from 1 to 9.

* * * * *